(12) United States Patent
Sasada

(10) Patent No.: US 7,755,726 B2
(45) Date of Patent: Jul. 13, 2010

(54) TRANSPARENT POLYMER FILM, AND OPTICAL COMPENSATORY FILM, POLARIZER AND LIQUID CRYSTAL DISPLAY DEVICE COMPRISING THE TRANSPARENT POLYMER FILM

(75) Inventor: Yasuyuki Sasada, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 608 days.

(21) Appl. No.: 11/661,600

(22) PCT Filed: Aug. 31, 2005

(86) PCT No.: PCT/JP2005/015884

§ 371 (c)(1),
(2), (4) Date: Sep. 12, 2007

(87) PCT Pub. No.: WO2006/025440

PCT Pub. Date: Mar. 9, 2006

(65) Prior Publication Data

US 2008/0204643 A1    Aug. 28, 2008

(30) Foreign Application Priority Data

Sep. 2, 2004  (JP) .............................. 2004-255180
Jul. 20, 2005 (JP) .............................. 2005-210474

(51) Int. Cl.
*G02F 1/1335*    (2006.01)

(52) U.S. Cl. ..................................................... 349/117

(58) Field of Classification Search ....................... None
See application file for complete search history.

(56) References Cited

U.S. PATENT DOCUMENTS

| | | | |
|---|---|---|---|
| 2002/0192397 A1 | 12/2002 | Tsujimoto | |
| 2008/0158489 A1* | 7/2008 | Ohgaru et al. | 349/117 |
| 2008/0254237 A1* | 10/2008 | Omatsu et al. | 428/1.31 |
| 2009/0066888 A1* | 3/2009 | Kunai et al. | 349/96 |
| 2009/0122243 A1* | 5/2009 | Sugiyama et al. | 349/118 |
| 2009/0128748 A1* | 5/2009 | Sasada | 349/96 |
| 2009/0244453 A1* | 10/2009 | Sasada | 349/117 |
| 2009/0322997 A1* | 12/2009 | Kaihoko et al. | 349/117 |

FOREIGN PATENT DOCUMENTS

| | | |
|---|---|---|
| JP | 2001-318233 A | 11/2001 |
| JP | 2001-343528 A | 12/2001 |
| JP | 2002-328233 A | 11/2002 |

OTHER PUBLICATIONS

International Preliminary Report on Patentability of PCT/JP2005/015884, International Filing date Aug. 31, 2005.

* cited by examiner

*Primary Examiner*—Sung H Pak
(74) *Attorney, Agent, or Firm*—Buchanan Ingersoll & Rooney PC

(57) ABSTRACT

A transparent polymer film satisfying Re<5, |Rth|<20, |Re(700)−Re(400)|<5, |Rth(700)−Rth(400)|<20, |Re(10%)−Re(80%)|<5, and |Rth(10%)−Rth(80%)|<15, and having a moisture permeability of at least 500 g/(m²·day) in terms of the thickness of 80 μm. The file is excellent in moisture resistance and having a small amount of optical anisotropy and capable of being directly stuck to a polarizing film.

20 Claims, 1 Drawing Sheet

TRANSPARENT POLYMER FILM, AND OPTICAL COMPENSATORY FILM, POLARIZER AND LIQUID CRYSTAL DISPLAY DEVICE COMPRISING THE TRANSPARENT POLYMER FILM

FIELD OF THE INVENTION

The present invention relates to a transparent polymer film being excellent in moisture resistance and having a small amount of optical anisotropy and capable of being directly stuck to a polarizing film, and an optical compensatory film, a polarizer and a liquid crystal display device comprising the transparent polymer film.

BACKGROUND ART

A polymer film of typically cellulose ester, polyester, polycarbonate, cyclo-olefin polymer, vinyl polymer or polyimide is used in silver halide photographic materials, retardation plates, polarizers and image display devices. Films that are more excellent in point of the surface smoothness and the uniformity can be produced from these polymers, and the polymers are therefore widely employed for optical films.

Of those, cellulose ester films can be directly stuck to most popular polarizing films formed of polyvinyl alcohol (PVA)/iodine in on-line operation, because they have suitable moisture permeability. Accordingly, cellulose acylate, especially cellulose acetate is widely employed as a protective film for polarizers. The protective film for polarizers is demanded to be excellent in optical isotropy. In particular, the optical properties of a protective film disposed between the polarizing film and a liquid crystal cell have a large influence on the visibility of liquid crystal display devices.

On the other hand, with the recent broadening of the viewing angle, improvement of retardation compensation is desired, and the retardation of a film disposed between the polarizing film and a liquid crystal cell is desired not to change. That is, desired is a film having a small retardation independently of the viewing angle, in other words, a film having a small in-plane retardation (Re: this may be simply referred to as Re) and a thickness-direction retardation (Rth: this may be simply referred to as Rth); and these retardations are desired not to change independently of wavelengths and measurement environments. For conventional cellulose acetate films, however, there are such problems that the realization of a film having a small retardation independent of the viewing angle is difficult, and that Rth changes largely depending on the measurement environment, in particular, humidity environment.

Films formed of polycarbonate or cyclo-olefin polymer are proposed as the film having a small retardation independently of the viewing angle (e.g., see JP-A-2001-318233, JP-A-2002-328233). These films can be commercially available, for example, as ZEONOR (by ZEON) and ARTON (by JSR). But, since these films have low moisture permeability, they can not be stuck directly as a protective film for a polarizing film, as compared with a cellulose acetate film.

Accordingly, such film is desired that has a reasonable moisture permeability, and a small Re and Rth independently of wavelengths and measurement environments.

When transparent polymer films are applied to optical uses, for example, to optical compensatory films, supports for optical compensatory films, protective films for polarizers and liquid crystal display devices, the control of their optical anisotropy is an extremely important element in determining the performance (e.g., visibility) of display devices. Thus, controlling suitably the optical anisotropy of transparent polymer film is important. However, it is generally considered that the control of the in-plane retardation (Re) is easy, but that the control of the thickness-direction retardation (Rth) is difficult.

Since especially excellent optical films can be produced, a method of solution casting film formation is employed most commonly. In the method of solution casting film formation, however, since compressive force is added inevitably in the thickness direction in the film formation process, the production of the film having a low thickness-direction retardation is very difficult.

When optical films are produced by a method of melt film formation, too, force may be added to the web in the film-forming step or a transporting step, therefore the production of films having a low retardation is difficult.

SUMMARY OF THE INVENTION

Problems that the Invention is to Solve

The present invention aims to provide a transparent polymer film having reasonable moisture permeability, and small Re and Rth independently of wavelengths and measurement environments. The invention also aims to provide a polarizer capable of exerting an excellent optical performance comprising the transparent polymer film of the invention that is directly stuck to a polarizing film as an optical compensatory film, a support of an optical compensatory film or a protective film for a polarizer, and a liquid crystal display device comprising the polarizer with a high reliability.

Means for Solving the Problems

The aforementioned problems are solved according to the following means.

(1) A transparent polymer film satisfying all the following formulae (I)-(III), and having a moisture permeability of at least 500 g/(m²·day) in terms of the thickness of 80 μm at 40° C. and a relative humidity of 90%:

$$Re<5, \text{ and } |Rth|<20 \tag{I}$$

$$|Re(700)-Re(400)|<5, \text{ and} \tag{II}$$

$$|Rth(700)-Rth(400)|<20$$

$$|Re(10\%)-Re(80\%)|<5, \text{ and} \tag{III}$$

$$|Rth(10\%)-Rth(80\%)|<15$$

wherein Re and Rth are in-plane retardation and thickness-direction retardation (unit: nm) respectively at a measuring wavelength of 632.8 nm, Re(λ) and Rth(λ) are in-plane retardation and thickness-direction retardation (unit: nm) respectively at a wavelength of λ (unit: nm), Re(H %) and Rth(H %) are in-plane retardation and thickness-direction retardation respectively at a relative humidity H (unit: %) and a measuring wavelength of 632.8 nm.

(2) An optical compensatory film provided with an optical anisotropy layer satisfying 0≦Re≦200 nm and |Rth|≦400 nm on the transparent polymer film described in (1).

(3) A polarizer comprising a first protective film, a second protective film and a polarizing film sandwiched between the first protective film and the second protective film, wherein the first protective film is formed of at least one sheet of transparent polymer film described in (1).

(4) A liquid crystal display device comprising the transparent polymer film described in (1), in particular, a liquid crystal display device wherein the polarizer described in (3) is arranged in such a manner that the first protective film lies on the liquid crystal cell side.

ADVANTAGE OF THE INVENTION

According to the invention, it is possible to provide a transparent polymer film having a reasonable moisture permeability and small Re and Rth independently of wavelengths and measuring environments, and further, an excellent optical compensatory film. In addition, since the transparent polymer film of the invention has a reasonable moisture permeability, it can be stuck to a polarizing film in on-line operation, thereby making it possible to provide polarizers excellent in visibility and liquid crystal display devices with a high reliability in a high productivity.

BEST MODE FOR CARRYING OUT THE INVENTION

Figure 1:
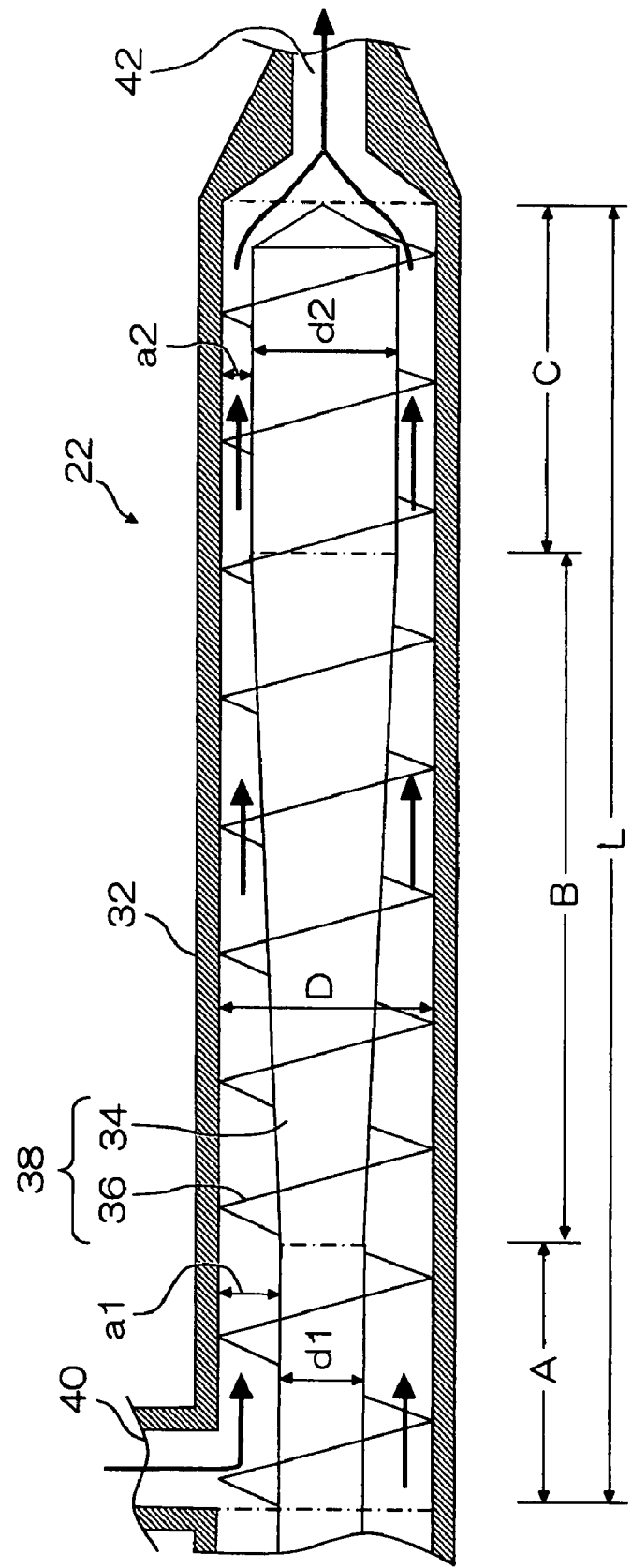
FIG. 1 is an outline drawing that illustrates the constitution of an extruder. L is a stretching distance, 22 is an extruder, 32 is a cylinder, 40 is a feeding port, A is a feeding section, B is a compressing section, and c is a measuring section.

Described in detail hereinafter are the transparent polymer film, the optical compensatory film, the polarizer and the liquid crystal display device of the present invention. The constituent features may be described below on the basis of representative embodiments of the invention, but the invention is not limited to such embodiments. The numerical range represented by "-" herein means a range including the numerical values described before and after "-" as the lowermost value and the uppermost value, respectively.

<<Transparent Polymer Film>>

The transparent polymer film of the invention is characterized by satisfying all the following formulae (I)-(III) and having a moisture permeability of at least 500 g/(m²·day) at 40° C. and a relative humidity of 90% in terms of the thickness of 80 μm:

$Re<5$, and $|Rth|<20$                     (I)

$|Re(700)-Re(400)|<5$, and                     (II)

$|Rth(700)-Rth(400)|<20$ $|Re(10\%)-Re(80\%)|<5$, and                     (III)

$|Rth(10\%)-Rth(80\%)|<15$ wherein Re and Rth are in-plane retardation and thickness-direction retardation (unit: nm) respectively at the measuring wavelength of 632.8 nm, Re(λ) and Rth(λ) are in-plane retardation and thickness-direction retardation (unit: nm) respectively at the wavelength of λ (unit: nm), Re(H %) and Rth(H %) are in-plane retardation and thickness-direction retardation respectively at a relative humidity H (unit: %) and a measuring wavelength of 632.8 nm.

As the result of satisfying all the above formulae (I) to (III), the transparent polymer film of the invention has a small Re and Rth independently of wavelengths, and further exhibits an optical anisotropy excellent in moisture resistance.

[Retardation]

Firstly, each of the retardations in the invention is described. In this DESCRIPTION, Re and Rth (unit: nm) are obtained according to the following method. A film is conditioned at 25° C. and a relative humidity of 60% for 24 hours. Using a prism coupler (model 2010 prism coupler, by METRICON) and using a He—Ne laser at 632.8 nm, the mean refractivity (n) of the film, which is represented by the following formula (a), is obtained at 25° C. and a relative humidity of 60%:

$n=(n_{TE}\times 2+n_{TM})/3$                     (a)

wherein $n_{TE}$ is the refractive index measured with polarizing light in the in-plane direction of the film; and $n_{TM}$ is the refractive index measured with polarizing light in the normal direction to the face of the film.

Next, using a birefringence meter (ABR-10a, by UNIOPT) and using a He—Ne laser at 632.8 nm, the slow axis and the retardation of the conditioned film are determined at 25° C. and a relative humidity of 60% both in the vertical direction relative to the sample film surface and in the direction inclined by ±40° from the normal line to the film face relative to the slow axis direction in the film as the inclination axis (rotation axis). Then, using the mean refractive index obtained in the above, nx, ny and nz are computed. According to the following formulae (b) and (c), the in-plane retardation (Re) and the thickness-direction retardation (Rth) of the film are computed:

$Re=(nx-ny)\times d$                     (b)

$Rth=\{(nx+ny)/2-nz\}\times d$                     (c)

wherein nx is the refractive index in the slow axis (x) direction of the film face; ny is the refractive index in the fast axis (y) direction of the film face; nz is the refractive index in the thickness direction of the film (in the normal direction to the film face); d is the thickness (nm) of the film. The slow axis is in the direction in which the refractive index is the largest in the film face, and the fast axis is in the direction in which the refractive index is the smallest in the film face.

Re(λ) and Rth(λ) (unit: nm) each represents the retardation in the plane and the retardation in the thickness direction at the wavelength of λ (unit: nm).

Re(λ) and Rth(λ) are measured to be computed at the wavelength of λ using a spectroscopic ellipsometer (M-150, by JASCO) and a Xe light source in the vertical direction relative to the film surface and in the direction inclined by ±40° from the normal line to the film face relative to the slow axis direction in the film plane as the inclination axis (rotation axis) after conditioning a film at 25° C. and a relative humidity of 60% for 24 hours.

The retardation in the plane Re(H %) and the retardation in the thickness direction Rth(H %) at a relative humidity of H (unit: %) are measured to be computed at 25° C. and a relative humidity of H % at a measuring wavelength of 632.8 nm in the same way as the above method after conditioning a film to be measured at 25° C. and a relative humidity of H % for 24 hours.

The retardation of the transparent polymer film of the invention satisfies all the above formulae (I)-(III). If it does not satisfy even any one of (I)-(III), the retardation of the film changes depending on viewing angles, wavelengths, measurement environments etc. The transparent polymer film of the invention satisfying all of the above formulae (I)-(III)

preferably satisfies all the following formulae (Ia)-(IIIa) respectively:

$$Re<4, \text{ and } |Rth|<15 \quad (Ia)$$

$$|Re(700)-Re(400)|<5, \text{ and} \quad (IIa)$$

$$|Rth(700)-Rth(400)|<15$$

$$|Re(10\%)-Re(80\%)|<4, \text{ and} \quad (IIIa)$$

$$|Rth(10\%)-Rth(80\%)|<10$$

The transparent polymer film of the invention more preferably satisfies all the following formulae (Ib)-(IIIb) respectively:

$$Re<2, \text{ and } |Rth|<10 \quad (Ib)$$

$$|Re(700)-Re(400)|<5, \text{ and} \quad (IIb)$$

$$|Rth(700)-Rth(400)|<10$$

$$|Re(10\%)-Re(80\%)|<2, \text{ and} \quad (IIIb)$$

$$|Rth(10\%)-Rth(80\%)|<8$$

The variation of these retardations in the transport direction and the width direction is preferably at most 10 nm, more preferably at most 8 nm, even more preferably at most 6 nm.

[Moisture Permeability]

Next, moisture permeability is described. The "moisture permeability" in the invention means an evaluated value from the change of mass (g/(m²·day)) before and after such humidity conditioning that respective films to be measured are used for capping and sealing cups containing calcium chloride to be left under conditions of 40° C. and a relative humidity of 90% for 24 hours.

The moisture permeability increases with the increase of temperature, and also with the increase of humidity, but the relation between the magnitudes of the moisture permeability of films is changeless independently of respective conditions. Therefore, in the invention, the value of mass change at 40° C. and a relative humidity of 90% are employed as the standard. But, since the moisture permeability decreases with the increase of the thickness of a film and increases with the decrease of the thickness, "the moisture permeability in terms of the thickness of 80 µm" in the invention is obtained by multiplying the actually measured moisture permeability by the actually measured thickness and then dividing it by 80.

The moisture permeability of the transparent polymer film of the invention is at least 500 g/(m²·day) in terms of 80 µm. The use of at least one sheet of the above film having a moisture permeability of at least 500 g/(m²·day) in terms of 80 µm allows the water contained in a polarizing film and an adhesive to be dried rapidly when the film is stuck to the polarizing film, which is preferred from the viewpoint of productivity and prevention of the lowering of initial polarizing degree. The moisture permeability in terms of 80 µm is preferably 500-1500 g/(m²·day), more preferably 600-1000 g/(m²·day).

In the polarizer of the invention, the protective film, which is stuck on the other side of the sandwiched polarizing film relative to the transparent polymer film, has a moisture permeability of preferably less than 500 g/(m²·day) in terms of 80 µm. By preparing a polarizer comprising the film having a moisture permeability of less than 500 g/(m²~day) in terms of 80 µm on the other side of a polarizing film relative to the transparent polymer film of the invention and manufacturing a liquid crystal display device comprising the film of the invention on the liquid crystal cell side, the durability of the polarizer for humidity, or humidity and heat is improved, and liquid crystal display devices having a high reliability can be provided, which is preferred. The moisture permeability of the film in terms of 80 µm is preferably less than 500 g/(m²·day), more preferably 50-450 g/(m²·day), even more preferably 100-400 g/(m²·day), most preferably 150-300 g/(m²·day).

[Thickness]

The thickness of the transparent polymer film of the invention is preferably 50 µm-180 µm, more preferably 60 ||m-150 µm, even more preferably 80 ||m-120 µm, from the viewpoint of the handling ability upon processing the film for a polarizer, the curing of the polarizer and productivity. The thickness unevenness of the transparent polymer film of the invention is preferably 0-2%, more preferably 0-1.5%, especially preferably 0-1%, in both the transfer direction and the width direction.

[Polymer]

The polymer that is the constitutive element of the transparent polymer film of the invention are cellulose ester, polyester, polycarbonate, cyclo-olefin polymer, vinyl polymer, polyamide and polyimide. Preferably, the polymer has a hydrophilic structure such as a hydroxyl group, an amide group, an imido group or an ester group in the backbone chain or the side branches thereof in order to attain a suitable moisture permeability. For the polymer, preferred is cellulose ester. The polymer may be powdery or granular, or may be pelletized.

Preferably, the water content of the polymer is at most 1.0% by mass, more preferably at most 0.7% by mass, most preferably at most 0.5% by mass. As the case may be, the water content may be preferably at most 0.2% by mass. In case where the water content of the polymer is outside the preferred range, then it is desirable that the polymer is dried by heating before use.

One or more such polymers may be used either singly or as combined.

[Cellulose Ester]

The cellulose ester includes cellulose ester compounds, and compounds having an ester-substituted cellulose skeleton that are obtained by biologically or chemically introducing a functional group into a starting material, cellulose. Of those, especially preferred is cellulose acylate.

Cellulose acylate is preferably used for the main component polymer of the transparent polymer film of the invention. The "main component polymer" as referred to herein is meant to indicate the polymer itself when the film is formed of a single polymer, and when the film is formed of different polymers, then it indicates the polymer having the highest mass fraction of all the polymers constituting the film.

The cellulose ester is an ester of cellulose with an acid. The acid to constitute the ester is preferably an organic acid, more preferably a carboxylic acid, even more preferably a fatty acid having 2-22 carbon atoms, most preferably a lower fatty acid having 2-4 carbon atoms.

The cellulose acylate is an ester of cellulose with a carboxylic acid. In the cellulose acylate, all or a part of the hydrogen atoms of the hydroxyl groups existing at the 2-, 3- and 6-positions of the glucose unit constituting the cellulose are substituted with an acyl group. Examples of the acyl group are acetyl, propionyl, butyryl, isobutyryl, pivaloyl, heptanoyl, hexanoyl, octanoyl, decanoyl, dodecanoyl, tridecanoyl, tetradecanoyl, hexadecanoyl, octadecanoyl, cyclohexanecarbonyl, oleoyl, benzoyl, naphthylcarbonyl and cinnamoyl. The acyl group is preferably acetyl, propionyl, butyryl, dodecanoyl, octadecanoyl, pivaloyl, oleoyl, benzoyl, naphthylcarbonyl or cinnamoyl, most preferably acetyl, propionyl or butyryl.

The cellulose acylate may be an ester of cellulose with different acids. The cellulose acylate may be substituted with different acyl groups.

In the transparent polymer film of the invention, especially preferred is cellulose acylate having an ester with a carboxylic acid having 2-4 carbon atoms. Concretely, cellulose acetate propionate, cellulose propionate, cellulose acetate butyrate or cellulose butyrate is included. The concrete substitution degree of these is described later, but in the transparent polymer film of the invention, the overall substitution degree of the cellulose ester is preferably within a suitable range in order to lower Re and Rth. By introducing a propionyl group or a butyryl group that is more hydrophobic than cellulose acetate as the cellulose ester, the humidity dependency of the retardation of the film can be lowered. At the same time, the introduction of a bulky substitution group can lower the film density and increase the moisture permeability of the film.

In the case where the cellulose acylate is cellulose acetate propionate or cellulose propionate, the acyl substitution degree to the hydroxyl group of cellulose satisfies preferably both the following formulae (IV) and (V):

$$2.70 \leq SA+SP \leq 3.00 \tag{IV}$$

$$2.00 \leq SP \leq 2.95 \tag{V}$$

wherein SA and SP represent the substitution degree of an acetyl group and the substitution degree of a propionyl group respectively substituted to the hydroxyl group of the cellulose.

The substitution degree of an acyl group to the hydroxyl group of cellulose satisfies more preferably both the following formulae (IVa) and (Va):

$$2.80 \leq SA+SP \leq 2.95 \tag{IVa}$$

$$2.20 \leq SP \leq 2.95 \tag{Va}$$

The substitution degree of an acyl group to the hydroxyl group of cellulose satisfies especially preferably both the following formulae (IVb) and (Vb):

$$2.85 \leq SA+SP \leq 2.95 \tag{IVb}$$

$$2.40 \leq SP \leq 2.90 \tag{Vb}$$

On the other hand, in case where the cellulose acylate is cellulose acetate butyrate or cellulose butyrate, the substitution degree of an acyl group to the hydroxyl group of cellulose satisfies preferably both the following formulae (VI) and (VII):

$$2.80 \leq SA+SB \leq 3.00 \tag{VI}$$

$$1.50 \leq SB \leq 2.50 \tag{VII}$$

wherein SA and SB represent the substitution degree of an acetyl group and the substitution degree of a butyryl group respectively having been substituted to the hydroxyl group of the cellulose.

The substitution degree of an acyl group to the hydroxyl group of cellulose satisfies more preferably both the following formulae (VIa) and (VIIa):

$$2.85 \leq SA+SB \leq 3.00 \tag{VIa}$$

$$1.50 \leq SB \leq 2.30 \tag{VIIa}$$

The substitution degree of an acyl group to the hydroxyl group of cellulose satisfies especially preferably both the following formulae (VIb) and (VIIb):

$$2.90 \leq SA+SB \leq 3.00 \tag{VIb}$$

$$1.50 \leq SB \leq 2.00 \tag{VIIb}$$

For cellulose acetate butyrate and cellulose butyrate, Rth decreases with the increase of the overall substitution degree, as is the case for other cellulose acylates. However, since the butyryl group has a flexible structure, the side branch lies in the plane by the compression force upon film forming to function for increasing Rth. Accordingly, in case where the cellulose acylate is cellulose acetate butyrate or cellulose butyrate, the acylate preferably has a higher overall substitution degree than in the case where the side branch is formed of an acetyl group or a propionyl group.

Regarding a method for producing cellulose acylate, its basic principle is described in *Wood Chemistry* by Nobuhiko Migita et al., pp. 180-190 (Kyoritsu Publishing, 1968). One typical method for producing cellulose acylate is a liquid-phase acylation method with carboxylic acid anhydride-carboxylic acid-sulfuric acid catalyst. Concretely, a starting material for cellulose such as cotton linter or woody pulp is pretreated with a suitable amount of a carboxylic acid such as acetic acid, and then put into a previously-cooled acylation mixture for esterification to produce a complete cellulose acylate (in which the overall substitution degree of acyl group in the 2-, 3- and 6-positions is nearly 3.00). The acylation mixture generally includes a carboxylic acid serving as a solvent, a carboxylic acid anhydride serving as an esterifying agent, and sulfuric acid serving as a catalyst. In general, the amount of the carboxylic acid anhydride to be used in the process is stoichiometrically excessive over the overall amount of water existing in the cellulose that reacts with the anhydride and that in the system.

Next, after the acylation, the excessive carboxylic acid anhydride still remaining in the system is hydrolyzed, for which, water or water-containing acetic acid is added to the system. Then, for partially neutralizing the esterification catalyst, an aqueous solution that contains a neutralizing agent (e.g., carbonate, acetate, hydroxide or oxide of calcium, magnesium, iron, aluminium or zinc) may be added thereto. Then, the resulting complete cellulose acylate is saponified and ripened by keeping it at 20-90° C. in the presence of a small amount of an acylation catalyst (generally, sulfuric acid remaining in the system), thereby converting it into a cellulose acylate having a desired substitution degree of acyl group and a desired polymerization degree. At the time when the desired cellulose acylate is obtained, the catalyst still remaining in the system is completely neutralized with the above-mentioned neutralizing agent; or the catalyst therein is not neutralized, and the cellulose acylate solution is put into water or diluted acetic acid (or water or diluted acetic acid is put into the cellulose acylate solution) to thereby separate the cellulose acylate, and thereafter this is washed and stabilized to obtain the intended product, cellulose acylate.

Preferably, the polymerization degree of the cellulose acylate is 150-500 as the viscosity-average polymerization degree thereof, more preferably 200-400, even more preferably 220-350, when the cellulose ester is formed into a film by a solution casting method. When the cellulose ester is formed into a film by melt film formation, the polymerization degree thereof is preferably 100-300 as the viscosity-average polymerization degree thereof, more preferably 120-250, even more preferably 130-200. The viscosity-average polymerization degree may be measured according to a limiting viscosity method by Uda et al. (Kazuo Uda, Hideo Saito; *Journal of the Fiber Society of Japan*, vol. 18, No. 1, pp. 105-120, 1962). The method for measuring the viscosity-average polymerization degree is described also in JP-A-9-95538.

Cellulose ester where the amount of low-molecular components is small may have a high mean molecular weight (high polymerization degree), but its viscosity may be lower than that of ordinary cellulose ester. Such cellulose ester where the amount of low-molecular components is small may be obtained by removing low-molecular components from cellulose ester produced in an ordinary method. The removal of low-molecular components may be attained by washing cellulose ester with a suitable organic solvent. Cellulose acylate where the amount of low-molecular components is small may be obtained by synthesizing it. In case where cellulose ester where the amount of low-molecular components is small is synthesized, it is desirable that the amount of the sulfuric acid catalyst in acylation is controlled to be 0.5-25 parts by mass relative to 100 parts by mass of cellulose. When the amount of the sulfuric acid catalyst is controlled to fall within the range, then cellulose ester having a preferable molecular weight distribution (uniform molecular weight distribution) can be synthesized.

The starting material, cotton for cellulose ester and methods for producing it are described also in Hatsumei Kyokai Disclosure Bulletin (No. 2001-1745, issued Mar. 15, 2001, Hatsumei Kyokai), pp. 7-12.

Regarding the concrete procedure for producing cellulose acylate that is employed preferably in the invention, synthesis examples 1 and 2 described later can be referred to.

[Production of Polymer Film]

The transparent polymer film of the invention may be produced by forming a film from a polymer solution that contains polymer and various additives, according to a method of solution casting film formation. In case where the melting point of the mixture of polymer and the various additives in the invention is lower than the decomposition temperature thereof, then the polymer film may also be produced by forming a film according to a method of melt casting film formation. The transparent polymer film of the invention may be produced according to such a method of melt casting film formation, and the method of melt casting film formation is described in JP-A-2000-352620.

[Solution Casting Film Formation]

<Polymer Solution>

(Solvent)

The transparent polymer film of the invention may be produced, for example, according to a method of solution casting film formation where a polymer solution that contains a polymer and optionally various additives is formed into a film.

The main solvent of the polymer solution (preferably, cellulose ester solution) to be used in producing the transparent polymer film of the invention is preferably an organic solvent that is a good solvent for the polymer. The organic solvent of the type is preferably one having a boiling point of not higher than 80° C. from the viewpoint of reducing the load in drying. More preferably, the organic solvent has a boiling point of 10-80° C., even more preferably 20-60° C. As the case may be, an organic solvent having a boiling point of 30-45° C. may also be preferably used for the main solvent.

The main solvent includes halogenohydrocarbons, esters, ketones, ethers, alcohols and hydrocarbons, which may have a branched structure or a cyclic structure. The main solvent may have two or more functional groups of any of esters, ketones, ethers and alcohols (i.e., —O—, —CO—, —COO—, —OH). Further, the hydrogen atoms in the hydrocarbon part of these esters, ketones, ethers and alcohols may be substituted with a halogen atom (especially, fluorine atom). Regarding the main solvent of the polymer solution (preferably, cellulose ester solution) to be used in producing the transparent polymer film of the invention, when the solvent of the solution is a single solvent, then it is the main solvent, but when the solvent is a mixed solvent of different solvents, then the main solvent is the solvent having the highest mass fraction of all the constitutive solvents.

The halogenohydrocarbon is preferably a chlorohydrocarbon, including dichloromethane and chloroform, and dichloromethane is more preferred.

The ester includes, for example, methyl formate, ethyl formate, methyl acetate, and ethyl acetate.

The ketone includes, for example, acetone, methyl ethyl ketone.

The ether includes, for example, diethyl ether, methyl tert-butyl ether, diisopropyl ether, dimethoxymethane, 1,3-dioxolan, 4-methyldioxolan, tetrahydrofuran, methyltetrahydrofuran, and 1,4-dioxane.

The alcohol includes, for example, methanol, ethanol, and 2-propanol.

The hydrocarbon includes, for example, n-pentane, cyclohexane, n-hexane, benzene, and toluene.

The organic solvent that may be combined with the main solvent includes halogenohydrocarbons, esters, ketones, ethers, alcohols and hydrocarbons, which may have a branched structure or a cyclic structure. The organic solvent may have any two or more functional groups of esters, ketones, ethers and alcohols (i.e., —O—, —CO—, —COO—, —OH). Further, hydrogen atoms in the hydrocarbon part of these esters, ketones, ethers and alcohols may be substituted with a halogen atom (especially, fluorine atom).

The halogenohydrocarbon is preferably a chlorohydrocarbon, including dichloromethane and chloroform, and dichloromethane is more preferred.

The ester includes, for example, methyl formate, ethyl formate, propyl formate, pentyl formate, methyl acetate, ethyl acetate, and pentyl acetate.

The ketone includes, for example, acetone, methyl ethyl ketone, diethyl ketone, diisobutyl ketone, cyclopentanone, cyclohexanone, and methylcyclohexanone.

The ether includes, for example, diethyl ether, methyl tert-butyl ether, diisopropyl ether, dimethoxymethane, dimethoxyethane, 1,4-dioxane, 1,3-dioxolan, 4-methyldioxolan, tetrahydrofuran, methyltetrahydrofuran, anisole, and phenetole.

The alcohol includes, for example, methanol, ethanol, 1-propanol, 2-propanol, 1-butanol, 2-butanol, tert-butanol, 1-pentanol, 2-methyl-2-butanol, cyclohexanol, 2-fluoroethanol, 2,2,2-trifluoroethanol, and 2,2,3,3-tetrafluoro-1-propanol.

The hydrocarbon includes, for example, n-pentane, cyclohexane, n-hexane, benzene, toluene, and xylene.

The organic solvent having two or more different types of functional groups includes, for example, 2-ethoxyethyl acetate, 2-methoxyethanol, 2-butoxyethanol, and methyl acetacetate.

In case where the polymer that constitutes the transparent polymer film of the invention includes cellulose acylate, then it is desirable that the total solvent for it contains 5%-30% by mass, more preferably 7%-25% by mass, even more preferably 10%-20% by mass of alcohol from the viewpoint of reducing the load for film peeling from a band.

In addition, from the viewpoint of Rth reduction, the polymer solution to be used for producing the transparent polymer film of the invention is preferably so designed that the content of the organic solvent therein which has a boiling point of 95° C. or higher and is not therefore so much evaporated away along with halogenohydrocarbon in the initial drying stage but is gradually concentrated therein and is a poor solvent for cellulose ester is 1%-15% by mass, more preferably 1.5%-13% by mass, even more preferably 2%-10% by mass.

Preferred examples of the combination of organic solvents for use as the solvent in the polymer solution to be used in producing the transparent polymer film of the invention are mentioned below, to which, however, the invention should not be limited. The numerical values for ratio are parts by mass.
(1) dichloromethane/methanol/ethanol/butanol=80/10/5/5
(2) dichloromethane/methanol/ethanol/butanol=80/5/5/10
(3) dichloromethane/isobutyl alcohol=90/10
(4) dichloromethane/acetone/methanol/propanol=80/5/5/10
(5) dichloromethane/methanol/butanol/cyclohexane=80/8/10/2
(6) dichloromethane/methyl ethyl ketone/methanol/butanol=80/10/5/5
(7) dichloromethane/butanol=90/10
(8) dichloromethane/acetone/methyl ethyl ketone/ethanol/butanol=68/10/10/7/5
(9) dichloromethane/cyclopentanone/methanol/pentanol=80/2/15/3
(10) dichloromethane/methyl acetate/ethanol/butanol=70/12/15/3
(11) dichloromethane/methyl ethyl ketone/methanol/butanol=80/5/5/10
(12) dichloromethane/methyl ethyl ketone/acetone/methanol/pentanol=50/20/15/5/10
(13) dichloromethane/1,3-dioxolan/methanol/butanol=70/15/5/10
(14) dichloromethane/dioxane/acetone/methanol/butanol=75/5/10/5/5
(15) dichloromethane/acetone/cyclopentanone/ethanol/isobutyl alcohol/cyclohexanone=60/18/3/10/7/2
(16) dichloromethane/methyl ethyl ketone/acetone/isobutyl alcohol=70/10/10/10
(17) dichloromethane/acetone/ethyl acetate/butanol/hexane=69/10/10/10/1
(18) dichloromethane/methyl acetate/methanol/isobutyl alcohol=65/15/10/10
(19) dichloromethane/cyclopentanone/ethanol/butanol=85/7/3/5
(20) acetone/ethanol/butanol=80/15/5
(21) methyl acetate/acetone/methanol/butanol=75/10/10/5
(22) dichloromethane=100
(23) 1,3-dioxolan=100

(Solution Concentration)

The polymer concentration in the polymer solution to be prepared is preferably 10%-50% by mass, more preferably 13%-40% by mass, most preferably 15%-30% by mass.

The polymer concentration may be so controlled that it could be a predetermined concentration in the stage where polymer is dissolved in solvent. Or, a solution having a low concentration (e.g., 9%-14% by mass) is previously prepared, and then it may be concentrated by evaporating the solvent from it. On the other hand, a solution having a high concentration is previously prepared, and it may be diluted. The polymer concentration in the solution may also be reduced by adding additive thereto.

(Additive)

The polymer solution to be used for producing the transparent polymer film of the invention may contain various liquid or solid additives in accordance with the application, in respective preparation steps. Examples of the additives are plasticizer (its preferred amount is 0.01-10% by mass of the polymer; the same shall apply hereunder), UV absorbent (0.001-1% by mass), powdery particles having a mean particle size of 5-3000 nm (0.001-1% by mass), fluorine-containing surfactant (0.001-1% by mass), release agent (0.0001-1% by mass), antioxidant (0.0001-1% by mass), optical anisotropy-controlling agent (0.01-10% by mass), IR absorbent (0.001-1% by mass).

The plasticizer and the optical anisotropy-controlling agent are organic compounds having a molecular weight of at most 3000, preferably those having both a hydrophilic part and a hydrophobic part. These compounds are aligned between the polymer chains, therefore changing the retardation of the polymer film. Combined with cellulose acylate that is especially preferably used in the invention, these compounds may improve the hydrophobicity of the polymer film and may reduce the moisture-dependent change of the retardation thereof. When combined with the above-mentioned UV absorbent or IR absorbent, they may effectively control the wavelength dependence of the retardation of the polymer film. The additives to be used in the transparent polymer film of the invention are preferably those not substantially evaporating in the step of drying the film.

From the viewpoint of reducing the moisture-dependent retardation change of the film, the amount of these additives to be added to the polymer film is preferably larger, but with the increase in the amount, there may occur some problems in that the glass transition temperature (Tg) of the polymer film may lower and the additives may evaporate away during the process of film formation. Accordingly, in case where cellulose acylate such as cellulose acetate propionate or cellulose propionate which is preferred in the invention is used as the polymer, then the amount of the additives having a molecular weight of at most 3000 is preferably 2-10% by mass, more preferably 3-10% by mass, even more preferably 4-9% by mass relative to the polymer. Further, in case where cellulose acetate butyrate or cellulose butyrate which is preferred in the invention is used as the polymer, then the amount of the additives having a molecular weight of at most 3000 is preferably 0-8% by mass, more preferably 2-8% by mass, even more preferably 4-8% by mass relative to the polymer.

A plasticizer preferred for the case where cellulose acylate is used as the polymer to constitute the transparent polymer film of the invention is described in JP-A-2001-151901. IR absorbent is described in JP-A-2001-194522. The time for additive addition may be determined depending on the type of the additive. The additives are described also in Hatsumei Kyokai Disclosure Bulletin (No. 2001-1745, issued Mar. 15, 2001, Hatsumei Kyokai), pp. 16-22. When the transparent polymer film of the invention has a multilayer structure, respective layers may contain the different type or amount of the additive from one another, for example, as described in JP-A-2001-151902.

<Preparation of Polymer Solution>

The polymer solution may be prepared, for example, according to the methods described in JP-A-58-127737, JP-A-61-106628, JP-A-2-276830, JP-A-4-259511, JP-A-5-163301, JP-A-9-95544, JP-A-10-45950, JP-A-10-95854, JP-A-11-71463, JP-A-11-302388, JP-A-11-322946, JP-A-11-322947, JP-A-11-323017, JP-A-2000-53784, JP-A-2000-273184, JP-A-2000-273239. Concretely, polymer and solvent are mixed and stirred so that the polymer is swollen, and as the case may be, this is cooled or heated so as to dissolve the polymer, and thereafter this is filtered to obtain a polymer solution. In the step for preparing a solution of such polymer as cellulose acetate propionate, cellulose propionate, cellulose acetate butyrate or cellulose butyrate which is preferred in the invention, since each of these has generally an excellent solubility in a solvent, no intended cooling or heating may not be carried out.

The polymer solution in the invention has a viscosity at 30° C. of preferably 1-400 Pa·s, more preferably 10-200 Pa·s.

The viscosity of the polymer solution in the invention can be measured by putting 1 mL of the sample solution into a vessel having a diameter of 4 cm and a cone angle of 2° (STEEL CONE, by Ta Instruments), and using a rheometer (CLS500, by Ta Instruments). For measurement conditions, those attached to the apparatus (Oscillation Step/Temperature Ramp) can be employed. The measurement is started after keeping the sample solution warm previously at the starting temperature until the solution temperature becomes constant.

<Casting, Drying>

The transparent polymer film of the invention may be produced according to a conventional method of solution casting film formation, using a conventional apparatus for solution casting film formation. Concretely, a dope (polymer solution) prepared in a dissolver (tank) is filtered, and then once stored in a storage tank in which the dope is degassed to prepare a final dope. The dope is kept at 30° C., and fed into a pressure die from the dope discharge port of the tank, via a metering pressure gear pump through which a predetermined amount of the dope can be fed with a high accuracy, for example, based on the controlled revolution number thereof, and then the dope is cast uniformly onto the metal support of a casting unit that runs endlessly, via the slit of the pressure die (casting step). Next, at a peeling point at which the metal support arrives almost after having traveled round the drum, a semi-dried dope film (this may be referred to as a web) is peeled from the metal support.

In the casting step, two or more types of polymer solutions may be co-cast simultaneously or co-cast sequentially. These two or more types of polymer solutions may have the entirely same compositions. In case where these two or more types of polymer solutions have different compositions from one another, the type of the solvent or the additive may be changed for each of the solutions. These two or more types of solutions may have different concentrations, or molecular weights of polymer aggregates, from one another. These two or more types of solutions may be retained at different temperatures from one another.

The web obtained by being peeled from the metal support is pinched with clips at the both ends thereof, transported and dried with a tenter while retaining the width thereof, then transported with a group of rolls in a drying apparatus to finish the drying and wound with a winding machine in an intended length. The combination of the tenter and the group of rolls are changed according to the purpose thereof.

In order to obtain a film having a low retardation as in the invention, not only a method of selecting suitably the primary structure of the polymer but also a method of widening the distance of the polymer backbone chain of the film is effective. Thus, a method of incorporating a previously mentioned organic solvent having a high boiling point and being a poor solvent, or such additive as a plasticizer or an optical anisotropy-controlling agent is effective. When the film is cooled after finishing the drying, it is an effective method to cool the film quickly from a state in which the film has a temperature above the glass transition temperature (Tg) thereof and a widened distance between backbone chains, thereby quenching the state while maintaining the widened distance between backbone chains. Accordingly, although a usual cooling rate is around 100° C./min, by blowing dehumidified air at around −30-10° C., the cooling is carried out at preferably 110-600° C./min, more preferably 120-350° C./min, even more preferably 150-300° C./min.

Thus dried film has a residual solvent amount of preferably 0-5% by mass, more preferably 0-2% by mass, even more preferably 0-1% by mass. After the drying, the film are trimmed of both edges and then wound. The transparent polymer film of the invention has a width of preferably 0.5-5 m, more preferably 0.7-3 m, even more preferably 1-2 m. The transparent polymer film of the invention has a wound length of preferably 300-30000 m, more preferably 500-10000 m, even more preferably 1000-7000 m.

[Melt Film Formation]

<Polymer Pellet>

(Additive)

In melt film formation, the same types of additives (plasticizer, ultraviolet absorber, fine particle powder having an average granular diameter of 5-3000 nm, fluorine-containing surfactant, releasing agent, degradation-inhibiting agent, optical anisotropy-controlling agent, infrared absorber) as those used in solution casting film formation can be employed. But, in the melt film formation, an additive serves to lower the melting point of polymer and to improve film formation properties, it is incorporated in preferably 2-20% by mass relative to the polymer, more preferably 3-18% by mass, even more preferably 4-15% by mass. The addition content of at least 2% by mass tends to achieve sufficiently the above effect, and on the other hand, the contend of at most 20% by mass tends to prevent the occurrence of bleeding (surface precipitation of the additive).

For the additives and optical anisotropy-controlling agent, organic compounds that are employed preferably for the solution casting film formation can be used, and in addition, the following polyhydric alcohol-based plasticizers can be used preferably.

(Plasticizer)

Polyhydric alcohol-based plasticizers employed preferably for melt film formation are glycerin-based ester compounds having good compatibility with cellulose aliphatic esters and expressing remarkably a thermoplastic effect such as glycerin esters and diglycerin esters, polyalkylene glycols such as polyethylene glycol and polypropylene glycol and compounds including an acyl group bonded to a hydroxyl group of polyalkylene glycol.

Concrete glycerin esters are glycerin diacetate stearate, glycerin diacetate palmitate, glycerin diacetate myristate, glycerin diacetate laurate, glycerin diacetate caprate, glycerin diacetate nonanate, glycerin diacetate octanoate, glycerin diacetate heptanoate, glycerin diacetate hexanoate, glycerin diacetate pentanoate, glycerin diacetate oleate, glycerin acetate dicaprate, glycerin acetate dinonanate, glycerin acetate dioctanoate, glycerin acetate diheptanoate, glycerin acetate dicaproate, glycerin acetate divalerate, glycerin acetate dibutyrate, glycerin dipropionate caprate, glycerin dipropionate laurate, glycerin dipropionate myristate, glycerin dipropionate palmitate, glycerin dipropionate stearate, glycerin dipropionate oleate, glycerin tributyrate, glycerin tripentanoate, glycerin monopalmitate, glycerin monostearate, glycerin distearate, glycerin propionate laurate, glycerin oleate propionate. But, compounds that can be employed for the invention are not limited to these, and one or more such compounds may be used either singly or as combined.

Of these, preferred are glycerin diacetate caprylate, glycerin diacetate pelargonate, glycerin diacetate caprate, glycerin diacetate laurate, glycerin diacetate myristate, glycerin diacetate palmitate, glycerin diacetate stearate, glycerin diacetate oleate.

Concrete examples of the diglycerin ester are diglycerin tetraacetate, diglycerin tetrapropionate, diglycerin tetrabutyrate, diglycerin tetravalerate, diglycerin tetrahexanoate, diglycerin tetraheptanoate, diglycerin tetracaprylate, diglycerin tetrapelargonate, diglycerin tetracaprate, diglycerin tetralaurate, diglycerin tetramyristate, diglycerin tetrapalmitate, and mixed acid-esters of diglycerin such as diglycerin triacetate propionate, diglycerin triacetate butyrate, diglycerin triacetate valerate, diglycerin triacetate hexanoate, diglycerin triacetate heptanoate, diglycerin triacetate caprylate, diglycerin triacetate pelargonate, diglycerin triacetate caprate, diglycerin triacetate laurate, diglycerin triacetate myristate, diglycerin triacetate palmitate, diglycerin triacetate stearate, diglycerin triacetate oleate, diglycerin diacetate dipropionate, diglycerin diacetate dibutyrate, diglycerin diacetate divalerate, diglycerin diacetate dihexanoate, diglycerin diacetate diheptanoate, diglycerin diacetate dicaprylate, diglycerin diacetate dipelargonate, diglycerin diacetate dicaprate, diglycerin diacetate dilaurate, diglycerin diacetate dimyristate, diglycerin diacetate dipalmitate, diglycerin diacetate distearate, diglycerin diacetate dioleate, diglycerin acetate tripropionate, diglycerin acetate tributyrate, diglycerin acetate trivalerate, diglycerin acetate trihexanoate, diglycerin acetate triheptanoate, diglycerin acetate tricaprylate, diglycerin acetate tripelargonate, diglycerin acetate tricaprate, diglycerin acetate trilaurate, diglycerin acetate trimyristate, diglycerin acetate tripalmitate, diglycerin acetate tristearate, diglycerin acetate trioleate, diglycerin laurate, diglycerin stearate, diglycerin caprylate, diglycerin myristate, diglycerin oleate. But compounds that can be employed for the invention are not limited to these, and one or more of these compounds may be used either singly or as combined.

Of these, preferred are diglycerin tetraacetate, diglycerin tetrapropionate, diglycerin tetrabutyrate, diglycerin tetracaprylate, and diglycerin tetralaurate.

Concrete examples of the polyalkylene glycol are polyethylene glycol, polypropylene glycol having an average molecular weight of 200-1000. But compounds that can be employed for the invention are not limited to these, and one or more of these compounds may be used either singly or as combined.

Concrete examples of compounds including an acyl group bonded to a hydroxyl group of polyalkylene glycol are polyoxyethylene acetate, polyoxyethylene propionate, polyoxyethylene butyrate, polyoxyethylene valylate, polyoxyethylene caproate, polyoxyethylene heptanoate, polyoxyethylene octanoate, polyoxyethylene nonanate, polyoxyethylene caprate, polyoxyethylene laurate, polyoxyethylene myristate, polyoxyethylene palmitate, polyoxyethylene stearate, polyoxyethylene oleate, polyoxyethylene linolate, polyoxypropylene acetate, polyoxypropylene propionate, polyoxypropylene butyrate, polyoxypropylene valylate, polyoxypropylene caproate, polyoxypropylene heptanoate, polyoxypropylene octanoate, polyoxypropylene nonanate, polyoxypropylene caprate, polyoxypropylene laurate, polyoxypropylene myristate, polyoxypropylene palmitate, polyoxypropylene stearate, polyoxypropylene oleate, and polyoxypropylene linolate. But compounds that can be employed for the invention are not limited to these, and one or more of these compounds may be used either singly or as combined.

In order to allow these polyhydric alcohol-based plasticizers to express the above described effect, the melt film formation of cellulose acylate is carried out preferably under the following conditions. That is, a film is formed in such a manner that pellets formed by mixing cellulose acylate and polyhydric alcohol are molten in a kneader and extruded from a die (preferably T die), wherein preferably the kneader has a temperature (T2) at the exit that is higher than a temperature (T1) at the inlet, and more preferably the die has a temperature (T3) that is higher than T2. In other words, the temperature is preferably raised with the progress of the melting. In case where the temperature is drastically raised at the inlet, the polyhydric alcohol melts firstly to be liquidized and cellulose acylate is suspended in it, which can not accept sufficient shear force from a water screw to generate insolubles. The mixture in which the mixing has not been progressed sufficiently can not express the effect of the plasticizer and can not give such effect as preventing the difference between the front and back sides of a melt film after the melt extrusion. In addition, such poorly soluble product forms a fisheye-shaped foreign substance after the film formation. Such foreign substance can not be viewed as a bright point according to the observation with a polarizer, rather it can be viewed on the screen by projecting light from the backside of the film. The fisheye causes tailing at the die outlet and also increases die lines.

T1 is preferably 150-200° C., more preferably 160-195° C., even more preferable 165-190° C. T2 is preferably 190-234° C., more preferably 200-230° C., even more preferably 200-225° C. Such melting temperatures T1, T2 are essentially at most 234° C. Temperatures higher than this temperature tend to result in the high elasticity modulus of the formed film. This is supposed that the melting at a high temperature cases the decomposition of cellulose acylate, which creates cross-linking to raise the elasticity modulus. The die temperature T3 is preferably from 200° C. to less than 235° C., more preferably 205-230° C., even more preferably 205-225° C.

(Stabilizer)

For a stabilizer, the use of either a phosphite-based compound or a phosphorous ester-based compound, or both these is preferred. This can prevent degradation with time and improve the die line as well. This is because these compounds serve as a leveling agent and eliminate the die line formed through the irregularity of a die.

The stabilizer is blended in an amount of preferably 0.005-0.5% by mass relative to the polymer, more preferably 0.01-0.4% by mass, even more preferably 0.02-0.3% by mass.

1) Phosphite-Based Stabilizer

Concrete phosphite-based color-preventing agents are not particularly limited, but preferred are phosphite-based color-preventing agents represented by the following formulae (2)-(4):

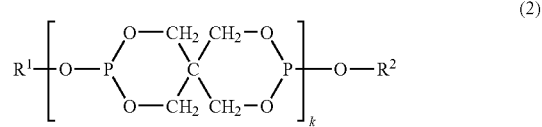

(2)

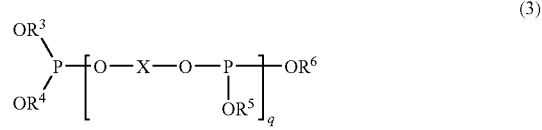

(3)

-continued

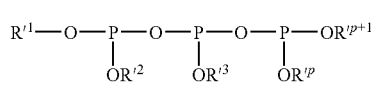
(4)

wherein $R^1, R^2, R^3, R^4, R^5, R^6, R'^1, R'^2, R'^3, \ldots R'^p, R'^{p+1}$ each independently represents a hydrogen atom or a group selected from the group consisting of an alkyl group, an aryl group, an alkoxyalkyl group, an aryloxyalkyl group, an alkoxyaryl group, an arylalkyl group, an alkylaryl group, an polyaryloxyalkyl group, a polyalkoxyalkyl group and a polyalkoxyaryl group having 4-23 carbon atoms. But, not all of the R in respective formulae (2), (3), (4) are hydrogen atoms. X in the phosphite-based color-preventing agent shown by the formula (3) represents a group selected from aliphatic chains, aliphatic chains having an aromatic nucleus in the side branch thereof, aliphatic chains having an aromatic nucleus in the chain, and chains comprising oxygen atoms that do not continue by two or more in the above-described chain. k, q each represents an integer of 1 or more, and p represents an integer of 3 or more.

The number of k, q in these phosphite-based color-preventing agents is preferably 1-10. By setting the number of k, q to at least 1, the volatility thereof at heating becomes small; and setting them to at most 10, the compatibility with cellulose acetate propionate is improved, which are preferred. p is preferably 3-10. By setting p to at least 3, the volatility thereof at heating becomes small; and setting it to at most 10, the compatibility with cellulose acetate propionate is improved, which are preferred.

For the concrete examples of the phosphite-based color-preventing agent represented by the formula (2), those represented by the following formulae (5)-(8) are preferred:

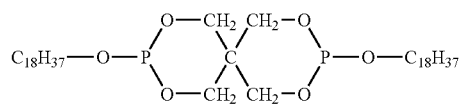
(5)

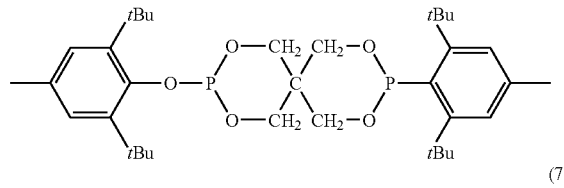
(6)

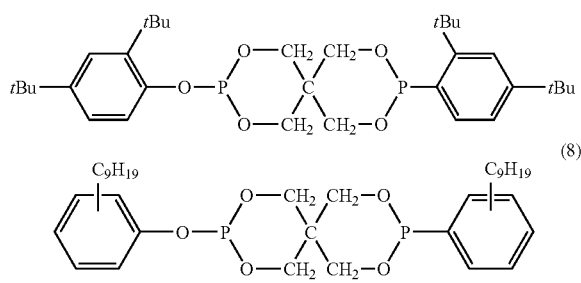
(7)

(8)

For the concrete examples of the phosphite-based color-preventing agent represented by the formula (3), those represented by the following formulae (9)-(11) are preferred:

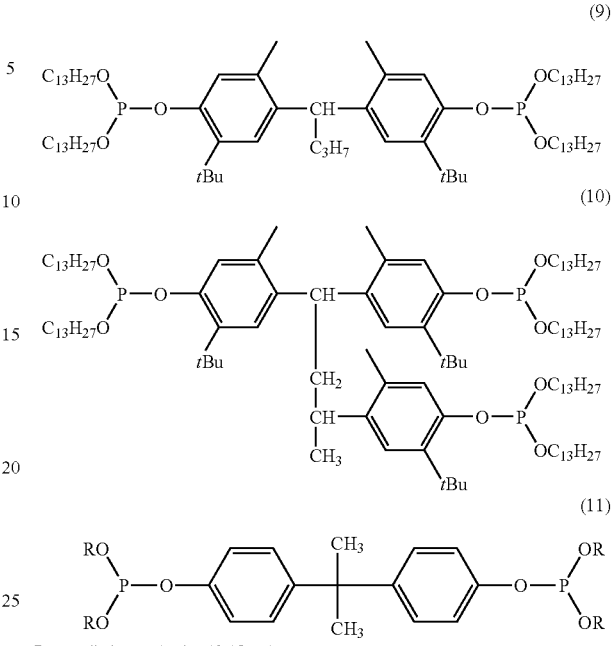

R = an alkyl group having 12-15 carbon atoms

2) Phosphorous Ester-Based Stabilizer

Phosphorous ester-based stabilizers are, for example, cyclic neopentane tetra-yl bis(octadecyl)phosphite, cyclic neopentane tetra-yl bis(2,4-di-t-butylphenyl)phosphite, cyclic neopentane tetra-yl bis(2,6-di-t-butyl-4-methylphenyl)phosphite, 2,2-methylene bis(4,6-di-t-butylphenyl)octylphosphite, and tris(2,4-di-t-butylphenyl)phosphite.

3) Other Stabilizers

As a stabilizer, a weak organic acid, a thioether-based compound, or an epoxy compound may be blended.

The weak organic acid means acids having pka of at least 1, which are not especially limited provided that it does not interfere the action of the invention and has color-preventing properties and physical deterioration-preventing properties. Examples thereof are tartaric acid, citric acid, malic acid, fumaric acid, oxalic acid, succinic acid, and maleic acid. One or more such acids may be used either singly or as combined.

Examples of the thioether-based compound are dilauryl thiodipropionate, ditridecyl thiodipropionate, dimyristyl thiodipropionate, distearyl thiodipropionate, and palmityl stearyl thiodipropionate. One or more such compounds may be used either singly or as combined.

Example of the epoxy compound are those derived from epichlorohydrin and bisphenol-A, and also usable are derivatives from epichlorohydrin and glycerin, and cyclic compounds such as vinyl cyclohexane dioxide and 3,4-epoxy-6-methylcyclohexylmethyl-3,4-epoxy-6-methylcyclohexane carboxylate. Epoxidized soybean oil, epoxidized caster oil, and long chain-α-olefin oxides can be used too. One or more such compounds may be used either singly or as combined.

(Pelletization)

Prior to the melt film formation, the cellulose acylate and the additive are preferably mixed and palletized.

When carrying out the pelletization, preferably the cellulose acylate and the additive are dried previously, but a bent type extruder may be used instead of the drying. In case where the drying is carried out, such drying method can be employed as heating them in a heating furnace at 90° C. for at least 8 hours, but this is not the only one method. The pellet can be formed by melting the cellulose acylate and the additive using a twin screw kneading extruder at 150-250° C., and solidifying the extruded product in a noodle state in water and then cutting it. The pellet may also be formed according to an under water cutting method in which the mixture is molten with an extruder and then extruded from a pipe sleeve directly into water to be cut.

For the extruder, any publicly known single screw extruder, non-intermeshing counter-rotating twin screw extruder, intermeshing counter-rotating twin screw extruder, intermeshing corotating twin screw extruder can be used as long as it can give sufficient melt kneading.

The pellet has preferably such size as the cross-sectional area of 1-300 mm$^2$ and the length of 1-30 mm, more preferably the cross-sectional area of 2-100 mm$^2$ and the length of 1.5-10 mm.

When the pellet is formed, the additive also may be thrown through the raw material-throwing port or vent port provided in the midstream of an extruder.

The extruder has a rotation number of preferably 10-1000 rpm, more preferably 20-700 rpm, even more preferably 30-500 rpm. The rotation number of at least 10 rpm can realize reasonable staying time, and thus the lowering of molecular weight caused by thermal degradation and yellow hue deterioration hardly occurs. When the rotation number is at most 1000 rpm, the break of the molecule due to shear hardly occurs, and thus the lowering of the molecular weight and the increase in the generation of cross-linked gel hardly occur.

In the pelletization, the staying time in the extruder is preferably 10 seconds-30 minutes, more preferably 15 seconds-10 minutes, even more preferably 30 seconds-3 minutes. When sufficient melting is possible, a shorter staying time is preferred in point that the degradation of resin and the generation of yellow hue can be prevented.

<Drying of Pellet>

In the invention, preferably the pellet formed by the above method is employed, and preferably the moisture in the pellet is reduced prior to the melt film formation.

In order to adjust the water content of the polymer to a preferred value in the invention, preferably the polymer is dried. For the drying, a dehumidification air dryer is often used, but the means for the drying is not limited only when an intended water content is attained (efficient drying is preferred by employing such means as heating, air blasting, pressure reduction and stirring either singly or as combined; more preferably a drying hopper is formed into a heat-insulated structure). The drying temperature is preferably 0-200° C., more preferably 40-180° C., especially preferably 60-150° C. A too low drying temperature not only requires time for the drying, but also can not give the targeted or lower value of the water content, which are not preferred. On the other hand, a too high drying temperature makes the resin adhesive to create blocking thereof, which is not preferred. The drying air volume is preferably 20-400 m$^3$/hr, more preferably 50-300 m$^3$/hr, especially preferably 100-250 m$^3$/hr. A too small drying air volume results in a low drying efficiency, which is not preferred. On the other hand, an air volume exceeding a certain value results in a small additional increase in the drying effect, which is uneconomic. The drying air has a dew point of preferably 0--60° C., more preferably −10--50° C., especially preferably −20--40° C. The necessary drying time is at least 15 minutes, preferably at least 1 hour, especially preferably at least 2 hours. On the other hand, the drying exceeding 50 hours results in a small additional reduction effect of the moisture percentage and generates concern for the thermal degradation of the resin, therefore an unnecessarily prolonged drying time is not preferred. The polymer in the invention has the water content of preferably at most 1.0% by mass, more preferably at most 0.1% by mass, especially preferably at most 0.01% by mass.

<Melt Extrusion>

The aforementioned polymer is melt-extruded using an extruder as shown in FIG. 1. That is, the polymer is firstly fed into a cylinder 32 via a feed port 40 of the extruder. The cylinder 32 comprises inside thereof a feed section (section A) for transporting quantitatively the polymer fed from the feed port, a compression section (section B) for melt-kneading and compressing the polymer, and a metering section (section C) for metering the melt-kneaded and compressed polymer in this order from the feed port 40 side. The resin is preferably dried by the aforementioned method in order to reduce the water content, wherein the drying is preferably carried out using an extruder through the inside of which an inert gas (such as nitrogen) flows, or using an extruder provided with a vent and vacuum-discharging air, in order to prevent the oxidation of molten resin by residual oxygen. The extruder has a screw compression ratio set to 2.5-4.5, and L/d set to 20-70. Here, the screw compression ratio is represented by the ratio of the volumes of the feed section A and the metering section C, that is (volume of feed section A per unit length)÷(volume of metering section C per unit length), which is computed using the outer diameter d1 of the screw shaft of the feed section A, the outer diameter d2 in the screw shaft of the metering section C, the groove portion diameter a1 of the feed section A, and the groove portion diameter a2 of the metering section C. L/D is the ratio of the cylinder length to the cylinder inner diameter. The extruding temperature is set to 190-240° C. When the temperature within the extruder exceeds 230° C., desirably a chiller is provided between the extruder and the die.

When the screw compression ratio is below 2.5 and too small, the mixture is not sufficiently melt-kneaded to generate unmolten portion or too small shear heat to result in insufficient melting of crystals, thus fine crystals tend to remain and, in addition, air bubbles tend to be mixed in a produced polymer film. As the result, the strength of the polymer film lowers, or when the film is stretched, the remaining crystals inhibit the stretchability of the film not to allow the alignment to be enhanced sufficiently. On the contrary, when the screw compression ratio is above 4.5 and too large, an excessive shear stress is applied and the resin tends to be degraded by heat generation, and thus yellow hue tends to appear for a produced film. In addition, the application of too much shear stress creates the cut of the molecule to decrease the molecular weight, thereby decreasing the mechanical strength of the film. Accordingly, in order to provide a film that hardly expresses yellow hue after the production thereof, has high film strength and is more resistant to the break on stretching, the screw compression ratio is in the range of preferably 2.5-4.5, more preferably 2.8-4.2, especially preferably 3.0-4.0.

When L/D is below 20 and too small, the melting and kneading become insufficient, and fine crystals tends to remain in the produced polymer film as is the case with the small compression ratio. On the contrary, when L/D is above 70 and too large, the staying time of the polymer in the extruder becomes too long to tend to cause the degradation of the resin. In addition, a long staying time causes the cut of the molecule or the lowering of the molecular weight to decrease the mechanical strength of the polymer film. Accordingly, in order to provide a film that hardly expresses yellow hue after the production thereof, has high film strength and is more resistant to the break on stretching, L/D is in the range of preferably 20-70, more preferably 22-65, especially preferably 24-50.

The extrusion temperature is set preferably in the above described temperature range. The film obtained in this way has such characteristic values as haze of at most 2.0%, a yellow index (YI value) of at most 10.

For the type of the extruder, generally a single screw extruder that requires a relatively low facility cost is used frequently, including such screw types as full-flight, Maddock and Dulmage. For the cellulose acylate resin having a comparatively low thermal stability, the full-flight type is preferred. The use of a twin screw extruder, which can practice the extrusion while volatizing unnecessary volatile components through a vent port provided in the midstream by changing the screw segment, is also possible, although the cost of facilities is high. The twin screw extruder is mainly classified into two types, i.e., co-rotation and counter-rotation types, both of which are usable herein. Of these, a co-rotation type, which hardly allows an accumulation portion to occur and has a high self-cleaning performance, is preferred. The twin screw extruder is suitable for the film formation of polymer because it has a high kneading ability and high feeding performance of resin to make extrusion at low temperatures possible, although facilities are expensive. By disposing a vent port properly, the direct use of undried polymer pellets or powder is also possible. Selvage of a film etc. that are formed during the film formation may be reused directly without drying.

The preferred diameter of a screw varies depending on a targeted extrusion volume per unit time, and is preferably 10-300 mm, more preferably 20-250 mm, even more preferably 30-150 mm.

<Filtration>

In order to filtrate foreign substances in resin or avoid damage of a gear pump caused by foreign substances, a so-called breaker plate type filtration is preferably carried out, wherein a filtering medium is provided for the extruder outlet. In addition, in order to filtrate foreign substances with a higher accuracy, a filtering apparatus built with a so-called leaf type disc filter is preferably disposed after the pass of the gear pump. The filtration can be effected by providing one filtration section, or may be multi-step filtration effected by providing a plurality of filtering sections. The filtering medium preferably may have a higher filtration accuracy, but from the viewpoint of the pressure capacity of the filtering medium or the increase of filtering pressure that is caused by the clogging of the filtering medium, the filtration accuracy is preferably 15-3 µmm, more preferably 10-3 µmm. In particular, in case where an apparatus using a leaf type disc filter that carries out final foreign substance filtration is employed, the use of a filtering medium having a high accuracy is preferred in point of the quality, and the adjustment based on the loading number of the filter sheet is possible for the purpose of securing the fitness for the pressure capacity and the lifetime of the filter. For the type of the filtering medium, since it is used under high temperatures and high pressures, the use of steel materials are preferred, and of these, the use of stainless steel or steel is preferred, and the use of stainless steel is especially desirable in point of corrosion resistance. For the filtering medium, in addition to those having a constitution formed by knitting wire material, a sintered filtering medium formed by sintering, for example, metal long fibers or metal powder can be used, and the sintered filtering medium is preferred from the viewpoint of the filtration accuracy and filter life.

<Melt Extrusion>

The polymer is molten with the extruder having such constitution as described above, and the molten resin is sent continuously to a die, according to need, via a filtering device and a gear pump. The die may be any type of commonly used T die, fish-tail die, hanger coat die, provided that it is so designed that a small volume of the molten resin is allowed to stay in the dice. In case of using a T die, a stick mixer for improving the uniformity of the resin temperature may be disposed just before the die without problem. The T die has a clearance of the outlet portion thereof that is generally 1.0-5.0 times the film thickness, preferably 1.2-3 times, more preferably 1.3-2.0 times. The lip clearance of less than 1.0 times the film thickness makes it difficult to give a sheet having good surface state by the film formation. The lip clearance that is large beyond 5.0 times the film thickness is not preferred because the thickness accuracy of the sheet is lowered. The die is a very important facility that determines the thickness accuracy of the film, and dies that can control severely the thickness adjustment are preferred. In the usual type, the thickness can be adjusted at intervals of 40-50 mm, but a type capable of adjusting the film thickness at intervals of at most 35 mm is preferred, and at most 25 mm is more preferred. Since cellulose acylate resin has high temperature dependency and sheer velocity dependency of the melt viscosity thereof, it is important to design a die having minimized temperature unevenness and flow rate unevenness in the width direction of the die. An automatic thickness-adjusting die, which meters the thickness of the downstream film, calculates the thickness deviation and feedbacks the result to the thickness adjustment for the die, is effective for reducing the thickness variation of the film in long term continuous production.

In the film production, commonly used is a monolayer film-forming apparatus for which low cost of facilities is necessary. But as the case may be, the production of a film having two or more types of structures is also possible for the purpose of providing a functional layer as an outer layer using a multilayer film-forming apparatus. In general, the functional layer is preferably laminated thinly on the surface layer, but the layer ratio is not particularly limited.

The molten resin extruded from the die in a sheet figure according to the above-described method is cooled and solidified on a casting drum to give a film. At this time, the adhesiveness between the casting drum and the melt-extruded sheet is preferably enhanced using such method as an electrostatic application method, an air knife method, an air chamber method, a vacuum nozzle method, a touch roll method. Such adhesiveness-enhancing method may be practiced for all the surface of the melt-extruded sheet, or a part thereof. In particular, a method referred to as an edge pinning for adhering only the both edges of the film is often applied, but the method is not limited to this.

A plurality of casting drums are preferably used for gradual cooling, and in particular, three cooling rolls are generally used with a comparatively high frequency, but this is not the only one embodiment. The roll has a diameter of preferably 50-5000 mm, more preferably 100-2000 mm, even more preferably 150-1000 mm. The distance of the plurality of rolls is preferably 0.3-300 mm between the faces, more preferably 1-100 mm, even more preferably 3-30 mm.

The casting drum has a temperature of preferably 60-160° C., more preferably 70-150° C., even more preferably 80-140° C. Subsequently, the film is peeled off from the casting drum and wound after passing through nip rolls. The winding velocity is preferably 10-100 m/min, more preferably 15-80 m/min, even more preferably 20-70 m/min.

The width in the film formation is preferably 0.7-5 m, more preferably 1-4 m, even more preferably 1.3-3 m. In case where a so-called touch roll method is employed, the touch roll may have the surface formed of rubber or resin such as TEFLON™, or may be a metal roll. Such a roll that is referred to as a flexible roll, which has a thin metal thickness to allow the roll surface to be flattened by the pressure at the touch and the pressure-contacted area to be widened, can be also used. The touch roll has a temperature of preferably 60-160° C., more preferably 70-150° C., even more preferably 80-140° C.

The sheet thus obtained is wound after trimming both edge portions thereof. The trimmed portions may be reused after having been subjected to pulverization treatment, or such treatment as granulation treatment, depolymerization/repolymerization according to need as a raw material for the film of the same type or the film of the different type. For a trimming cutter, any type such as a rotary cutter, a shear blade, a knife may be employed. It may have the quality of either carbon steel or stainless steel. In general, the use of a cemented carbide blade, a ceramic blade results in a long blade life and prevents the generation of cut chips, which is preferred.

Prior to the winding, a laminating film is preferably stuck onto at least one surface of the film from the viewpoint of scratch resistance. The winding tension is preferably 1 kg/m·width-50 kg/width, more preferably 2 kg/m·width-40 kg/width, even more preferably 3 kg/m·width-20 kg/width. When the winding tension is at least 1 kg/m·width, the film is easily wound uniformly. On the other hand, when the winding tension is at most 50 kg/width, the film is hardly wound tightly, to result in a good winding appearance, thereby hardly leading to the elongation of the lump portion of the film by a creep phenomenon to cause the waving of the film, and the occurrence of residual birefringence due to the elongation of the film. The film is preferably wound while detecting the winding tension with a tension control disposed in the midstream of the line and controlling the winding tension to be a constant value. When the difference of film temperature exists depending on the location of the film formation line, occasionally the film length may slightly vary due to thermal expansion, it is necessary therefore to adjust the draw ratio between nip rolls and avoid such phenomenon that the film is applied with a tension exceeding a specified value.

The winding tension may be kept constant for the winding through the tension control, but is preferably sloped corresponding to the wound diameter to result in an appropriate winding tension. In general the tension is gradually reduced with the increase of the wound diameter, but as the case may be, the tension is preferably increased with the increase of the wound diameter.

[Stretching of Film]

For the purpose of adjusting Re and Rth, the transparent polymer film of the invention can be stretched. The stretching may be carried out in the film formation step in an undried state (e.g., between the peeling off after the casting and the completion of the drying), or after the completion of the drying. These stretching may be carried out in the film formation step in on-line operation, or in off-line operation after once winding the film after the completion of the film formation.

The stretching is carried out at a temperature of preferably $Tg-(Tg+50°\ C.)$, more preferably $(Tg+1°\ C.)-(Tg+30°\ C.)$, even more preferably $(Tg+2°\ C.)-(Tg+20°\ C.)$. The stretching here is not one for creating positively the retardation, but for canceling Re that is generated secondarily by the draw in the transport direction which has been applied to the film at film formation. Accordingly, the preferred stretching direction is the width direction, and the stretching magnification ratio is preferably 0.1-20%, more preferably 0.5-10%, even more preferably 1-8%. These stretching may be carried out in one step, or in multiple steps. "The stretching magnification ratio (%)" here is a value obtained by using the following formula:

Stretching magnification ratio (%)=100×{(length after stretching)−(length before stretching)}/length before stretching Such stretching may be carried out in the longer direction (longitudinal stretching) using two or more pairs of nip rolls for which the circumferential velocity is larger on the outlet side, but preferably the film is widened in orthogonal directions (longer direction and direction perpendicular to it) (lateral stretching) by gripping the film with chucks at both edges.

Further, controlling the ratio between Re and Rth at will can be attained, in the case of the longitudinal stretching, by controlling the value obtained by dividing the distance between the pair of nip rolls by the film width (length to width ratio). That is, by making the length to width ratio small, the Rth/Re ratio can be made large. In the case of a lateral stretching, for example, the ratio can be controlled by stretching the film in the orthogonal directions and also in the longitudinal direction at the same time, or inversely, relaxing the film in the longitudinal direction. That is, the Rth/Re ration can be increased by stretching the film in the longitudinal direction, and inversely, the Rth/Re ration can be decreased by relaxing the film in the longitudinal direction.

The stretching velocity in the above-described stretching is preferably 10-10000%/min, more preferably 20-1000%/min, even more preferably 30-800%/min.

The angle θ formed between the film formation direction (longitudinal direction) and the slow axis of Re of the film is preferably 0±3°, +90±3° or −90±3°, more preferably 0±2°, +90±20° or −90±2°, even more preferably 0±1°, +90±1° or −90±1°.

[Surface Treatment]

The transparent polymer film of the invention may be surface-treated in any desired manner to thereby improve its adhesiveness to various functional layers (e.g., undercoat layer, back layer, optically anisotropic layer). The surface treatment includes glow discharge treatment, UV irradiation treatment, corona treatment, flame treatment, saponification treatment (acid saponification treatment, alkali saponification treatment). In particular, glow discharge treatment and alkali saponification treatment are preferred. The "glow discharge treatment" as referred to herein is a plasma treatment of treating a film surface in the presence of a plasma-exciting vapor.

The glow discharge treatment includes low-temperature plasma treatment that is carried out under a low pressure gas of $10^{-3}$-20 Torr (0.13-2700 Pa). In addition, plasma treatment under atmospheric pressure is also a preferred glow discharge treatment. For the plasma-exciting vapor, argon, helium, neon, krypton, xenon, nitrogen, carbon dioxide, fluorocarbon (e.g., tetrafluoromethane) or a mixture thereof is employed. Plasma treatment under atmospheric pressure is carried out at preferably 10-1000 KeV, more preferably 30-500 KeV. The irradiation energy is preferably 20-500 kGy, more preferably 20-300 kGy. The glow discharge treatment is described in Hatsumei Kyokai Disclosure Bulletin (No. 2001-1745, issued Mar. 15, 2001, Hatsumei Kyokai), pp. 30-32.

The alkali saponification treatment is especially preferably employed when the polymer is cellulose acylate, and can be carried out by either coating a film with an alkali saponification liquid, or dipping a film into an alkali saponification liquid.

Examples of the adoptable method of coating the alkali saponification liquid are a dip coating method, a curtain coating method, an extrusion coating method, a bar coating method and an E type coating method. For the solvent of the alkali saponification liquid, one having good wettability for the film and capable of not forming irregularities on the film surface to keep the surface in a good state is desirable. Concretely, alcohol is preferred as the solvent, and isopropyl alcohol is especially preferred. Water (preferably an aqueous solution of a surfactant) can be also used as the solvent. Alkalis for use in the alkali saponification treatment are preferably alkali metal hydroxides, and of those, KOH and NaOH are more preferred. The pH of the alkali saponification liquid is at least 10, more preferably at least 12. The reaction conditions upon alkali saponification is preferably at room temperature for 1 second-5 minutes, more preferably for 5 seconds-5 minutes, most preferably 20 seconds-3 minutes. After the alkali saponification reaction, preferably the saponification liquid-coated surface is washed with water, or with acid and then with water. The coating type saponification treatment and the after-mentioned coating of liquid for an alignment film can be carried out continuously, to reduce the number of process steps. Concretely, the content of these saponification methods is described, for example, in JP-A-2002-82226, WO 02/46809.

For improving the adhesiveness between the film surface of the transparent polymer film of the invention and a functional layer to be formed thereon, an undercoat layer (adhesive layer) may be formed on the film in place of or in addition to the surface treatment as above. The undercoat layer is described in Hatsumei Kyokai Disclosure Bulletin (No. 2001-1745, issued Mar. 15, 2001, Hatsumei Kyokai), page 32, which may be conveniently employed herein.

Functional layers that may be formed on the transparent polymer film of the invention are described in Hatsumei Kyokai Disclosure Bulletin (No. 2001-1745, issued Mar. 15, 2001, Hatsumei Kyokai), pp. 32-45, which may be conveniently employed herein.

<<Optical Compensatory Film>>

The transparent polymer film of the invention may be used as an optical compensatory film (optical compensatory film of the invention) of crystal display devices. The "optical compensatory film" means an optical material that is used commonly in liquid crystal display devices for compensating retardation, and its meaning may be the same as that of retarder, optical compensatory sheet. The optical compensatory film has birefringent property and is used, in a liquid crystal display device, for the purpose of removing the coloration of display panel and improving the viewing angle characteristic thereof.

The transparent polymer film of the invention has small Re and Rth independently of wavelengths and measurement environments, therefore in case where the film is used for a support of an optical compensatory film, and then an optical anisotropy layer formed of liquid crystal etc. is formed thereon, there can be obtained an optical compensatory film having an intended optical performance and small fluctuation of retardation along with variation of environment such as humidity.

When the transparent polymer film of the invention is employed for the optical compensatory film of liquid crystal display devices, Re and Rth of a combined optical anisotropy layer preferably satisfies $0 \leq Re \leq 200$ nm and $|Rth| \leq 400$ nm. In case where Re and Rth are within this range, any optical anisotropy layer may be acceptable. The Re and Rth in this case also mean those at a measurement wavelength of 632.8 nm. To the optical compensatory film of the invention, any optical anisotropy layer desired as an optical compensatory film can be applied, without being limited by the optical performance and driving system of a liquid crystal cell of liquid crystal display devices. The optically anisotropic layer applicable to the optical compensation film of the invention may be formed from, for example, a composition containing a liquid crystalline compound or a polymer film having birefringence.

The liquid crystalline compound is preferably a discotic liquid crystalline compound or a rod-shaped liquid crystalline compound.

[Discotic Liquid Crystalline Compound]

Examples of the discotic liquid crystalline compound usable in the invention are described in various publications (e.g., c. Destrade et al., *Mol. Cryst. Liq. Cryst.*, vol. 71, page 111 (1981); *Quarterly Outline of Chemistry*, No. 22, Chemistry of Liquid Crystal, Chap. 5, Chap. 10, Sec. 2 (1994), by the Chemical Society of Japan; B. Kohne et al., *Angew. Chem. Soc. Chem. Comm.*, page 1794 (1985); J. Zhang et al., *J. Am. Chem. Soc.*, vol. 116, page 2655 (1994)).

Preferably, the discotic liquid crystalline molecules are fixed as aligned in the optically anisotropic layer; and most preferably, they are fixed through polymerization reaction. The polymerization of discotic liquid crystalline molecules is described in JP-A-8-27284. For fixing discotic liquid crystalline molecules through polymerization, it is necessary that a substituent of a polymerizing group is bonded to the disc core of the discotic liquid crystalline molecules. However, when a polymerizing group is directly bonded to the disc core, then the molecules could hardly keep their alignment condition during the polymerization. Accordingly, a linking group is introduced between the disc core and the polymerizing group. The discotic liquid crystalline molecules having a polymerizing group are disclosed in JP-A-2001-4387.

[Rod-Shaped Liquid Crystalline Compound]

Examples of the rod-shaped liquid crystalline compound usable in the invention are azomethines, azoxy compounds, cyanobiphenyls, cyanophenyl esters, benzoic esters, phenyl cyclohexanecarboxylates, cyanophenylcyclohexanes, cyano-substituted phenylpyrimidines, alkoxy-substituted phenylpyrimidines, phenyldioxanes, tolans and alkenylcyclohexylbenzonitriles. However, not limited to such low-molecular rod-shaped liquid crystalline compounds, also usable herein are high-molecular rod-shaped liquid crystal compounds.

In the optically anisotropic layer, the rod-shaped liquid crystalline molecules are preferably fixed as aligned therein; and most preferably, they are fixed through polymerization reaction. Examples of the polymerizing rod-shaped liquid crystalline compound usable in the invention are described, for example, in *Macromol. Chem.*, vol. 190, page 2255 (1989); *Advanced Materials*, vol. 5, page 107 (1993); U.S. Pat. No. 4,683,327, U.S. Pat. No. 5,622,648, U.S. Pat. No. 5,770,107; WO 95/22586, WO 95/24455, WO 97/00600, WO 98/23580, WO 98/52905; JP-A-1-272551, JP-A-6-16616, JP-A-7-110469, JP-A-11-80081 and JP-A-2001-328973.

(Optically Anisotropic Layer Formed of Polymer Film)

The optically anisotropic layer may be formed of a polymer film. The polymer film may be made of a polymer capable of expressing optical anisotropy. Examples of the polymer capable of expressing optical anisotropy are polyolefins (e.g., polyethylene, polypropylene, norbornen-based polymer), polycarbonates, polyarylates, polysulfones, polyvinyl alcohols, polymethacrylic esters, polyacrylic esters, and cellulose esters (e.g., cellulose triacetate, cellulose diacetate). The polymer may be a copolymer or a polymer mixture of these polymers.

The optical anisotropy of the polymer film is preferably obtained through stretching. In this case, the stretching is preferably either uniaiaxial stretching or biaxial stretching. Concretely, preferred are longitudinal uniaxial stretching utilizing the difference of the circumferential velocity of two or more rolls, tenter stretching in which a polymer film is gripped on both sides thereof and stretched in the width direction, and biaxial stretching constituted of the combination thereof. These may be carried out in one step or multi steps. In case where two or more sheets of films are used, the overall optical property of two or more films may satisfy the aforementioned conditions. The polymer film is preferably produced by a solvent cast method in order to lessen the unevenness of birefringence. The polymer film has a thickness of preferably 20-500 µm, most preferably 40-100 µm.

For the formation method of a polymer film for forming the optically anisotropic layer, a method for forming a film is also employed preferably, in which at least one type of polymer material selected from the group consisting of polyamide, polyimide, polyester, polyether ketone, polyamideimide, polyesterimide and polyaryl ether ketone is employed and dissolved in a solvent to be coated on the base material and the solvent is dried to form a film. In this case, such technique can be also used preferably that the polymer film and the base material are stretched to express optical anisotropy and they are used as an optically anisotropic layer. In this case, the transparent polymer film of the invention is used preferably as the base material. Such technique is also preferred that the polymer film is prepared on an other base material, peeled off from the base material, and then stuck and combined to the transparent polymer film of the invention, which is used as an optically anisotropic layer.

<<Polarizer>>

The transparent polymer film or the optical compensatory film of the invention may be used as a protective film of a polarizer (polarizer of the invention) The polarizer of the invention comprises a polarizing film and two polarizer-protective films (transparent polymer films) that protect both surfaces of the film, in which the transparent polymer film etc. of the invention may be used as at least one of the polarizer-protective films.

In case where the transparent polymer film of the invention is used as the polarizer-protective film, then it is desirable that the transparent polymer film of the invention is subjected to the above-mentioned surface treatment (described also in each of JP-A-6-94915, JP-A-6-118232) for hydrophilication. For example, the film is preferably subjected to glow discharge treatment, corona discharge treatment or alkali saponification treatment. In particular, when the polymer to constitute the transparent polymer film of the invention is cellulose acylate, the most preferable surface treatment to be used is alkali saponification treatment.

For the polarizing film, for example, herein usable is a polyvinyl alcohol film dipped and stretched in an iodine solution. In case where such a polyvinyl alcohol film dipped and stretched in an iodine solution is used as the polarizing film, the treated surface of the transparent polymer film of the invention may be stuck to both surfaces of the polarizing film with an adhesive. The adhesive may be an aqueous solution of polyvinyl alcohol or polyvinyl acetal (e.g., polyvinyl butyral), or a latex of vinylic polymer (e.g., polybutyl acrylate). An especially preferred adhesive is an aqueous solution of completely-saponified polyvinyl alcohol.

During the period of from the production to the use of the polarizer, one surface of the polarizer is laminated with an outside-protective film, and the opposite surface with a separate film. The outside-protective film and the separate film are used for the purpose of protecting the polarizer in the shipping and the product inspection of the polarizer. The outside-protective film is used for the surface on the side opposite to the surface through which the polarizer is stuck to a liquid crystal cell. The separate film is used for the purpose of covering an adhesive layer for sticking the polarizer to a liquid crystal cell.

In liquid crystal display devices, generally, a liquid crystal cell is disposed between two polarizers, and for the liquid crystal cell, generally, liquid crystal is injected between two substrates. Consequently, ordinary liquid crystal display devices have four polarizer-protective films. The transparent polymer film of the invention may be used for any of the four polarizer-protective films. In this regard, however, since the transparent polymer film of the invention has such characteristic as high moisture permeability, in order to improve the degradation of the polarizer with time when it is used in liquid crystal display devices, the transparent polymer film of the invention can be especially advantageously employed as a protective film to be disposed between the polarizing film and the liquid crystal layer (liquid crystal cell) in liquid crystal display devices.

In this case, for the film that is disposed on the opposite side to the transparent polymer film of the invention while sandwiching the polarizing film therebetween in order to further improve the degradation of the polarizer with time when it is used in liquid crystal display devices, preferably used is a transparent polymer film having a moisture permeability of less than 500 g/(m²·day) in terms of a thickness of 80 µm at 40° C. and a relative humidity of 90%. Concretely, the moisture permeability is more preferably from 100 to less than 500 g/(m²·day) in terms of a thickness of 80 µm, even more preferably from 250 to less than 500 g/(m²·day). Such polymer films are, for example, the film of cellulose ester, polyester, polycarbonate, cyclo-olefin polymer, vinyl polymer, polyamide, and polyimide. Of these, a film having physical properties such as an expansion coefficient that is approximate to that of the transparent polymer film of the invention is used preferably. For example, in case where the transparent polymer film of the invention is a cellulose acylate film, a cellulose acylate film having a moisture permeability of less than 500 g/(m²·day) in terms of a thickness of 80 µm at 40° C. and a relative humidity of 90% is used preferably. Such film includes cellulose triacetate film. On the protective film to be disposed on the opposite side to the transparent polymer film of the invention via the polarizing film therebetween, optionally provided is a transparent hard-coat layer, an antiglare layer or an antireflection layer, which is favorably used, in particular, as the polarizer-protective film on the outermost surface of the display side of a liquid crystal display device.

<<Liquid Crystal Display Device>>

The transparent polymer film, the optical compensatory film and the polarizer of the invention may be used in liquid crystal display devices of various display modes. Liquid crystal display modes to which these films are applicable are described below. Of those modes, the transparent polymer film, the optical compensatory film and the polarizer of the invention are favorably used, in particular, in liquid crystal display devices of IPS mode. The liquid crystal display devices may be any of transmission type, reflection type and semi-transmission type.

(TN-Type Liquid Crystal Display Device)

The transparent polymer film of the invention may be used as a support of the retardation film in a TN-type liquid crystal display device having a TN-mode liquid crystal cell. TN-mode liquid crystal cells and TN-type liquid crystal display devices are well known from the past. The optical compensatory sheet to be used in TN-type liquid crystal display devices is described in JP-A-3-9325, JP-A-6-148429, JP-A-8-50206, JP-A-9-26572; and Mori et al's reports (Jpn. J. Appl. Phys., vol. 36 (1997), p. 143; Jpn. J. Appl. Phys., vol. 36 (1997), p. 1068).

(STN-Type Liquid Crystal Display Device)

The transparent polymer film of the invention may be used as a support of the retardation plate in an STN-type liquid crystal display device having an STN-mode liquid crystal cell. In general, in an STN-type liquid crystal display device, the rod-shaped liquid crystalline molecules in the liquid crystal cell are twisted within a range of from 90 to 360 degrees, and the product ($\Delta$nd) of the refractive anisotropy ($\Delta$n) of the rod-shaped liquid crystalline molecule and the cell gap (d) is within a range of from 300 to 1500 nm. The optical compensatory sheet to be used in STN-type liquid crystal display devices is described in JP-A-2000-105316.

(VA-Type Liquid Crystal Display Device)

The transparent polymer film of the invention may be used as the retardation plate or as a support of the retardation plate in a VA-type liquid crystal display device having a VA-mode liquid crystal cell. The VA-type liquid crystal display device may be a multi-domain system, for example, as in JP-A-10-123576.

(IPS-Type Liquid Crystal Display Device and ECB-Type Liquid Crystal Display Device)

The transparent polymer film of the invention is especially advantageously used as the retardation plate, a support of the retardation plate or a protective film of the polarizer in an IPS-type liquid crystal display device or an ECB-type liquid crystal display device having an IPS-mode or an ECB-mode liquid crystal cell. In these modes, the liquid crystal material is aligned nearly in parallel to one another at the time of black level, or that is, the liquid crystal molecules are aligned in parallel to the substrate face while no voltage is applied thereto, thereby giving black level. In these embodiments, the polarizer that comprises the transparent polymer film of the invention contributes to enlarging the viewing angle of the display panel and to improving the contrast thereof.

(OCB-type Liquid Crystal Display Device and HAN-Type Liquid Crystal Display Device)

The transparent polymer film of the invention is also especially advantageously used as a support of the retardation plate in an OCB-type liquid crystal display device having an OCB-mode liquid crystal cell and in a HAN-type liquid crystal display device having a HAN-mode liquid crystal cell. The retardation plate to be used in an OCB-type liquid crystal display device and a HAN-type liquid crystal display device is preferably so designed that the direction in which the absolute value of the retardation of the film is the smallest does not exist both in the in-plane direction of the retardation plate and in the normal direction thereof. The optical properties of the retardation plate to be used in an OCB-type liquid crystal display device and a HAN-type liquid crystal display device may vary depending on the optical properties of the optically anisotropic layer therein, the optical properties of the support therein and the relative positioning of the optically anisotropic layer and the support therein. The retardation plate to be used in an OCB-type liquid crystal display device and a HAN-type liquid crystal display device is described in JP-A-9-197397. It is described also in a Mori et al's report (Jpn. J. Appl. Phys., vol. 38 (1999), p. 2837).

(Reflection-Type Liquid Crystal Display Device)

The transparent polymer film of the invention may be advantageously used also as the retardation plate in TN-mode, STN-mode, HAN-mode and GH (guest-host)-mode reflection-type liquid crystal display devices. These display modes are well known from the past. TN-mode reflection-type liquid crystal display devices are described in JP-A-10-123478, WO 98/48320, Japanese Patent 3022477. The optical compensatory sheet for use in reflection-type liquid crystal display devices is described in WO 00/65384.

(Other Liquid Crystal Display Devices)

The transparent polymer film of the invention may be advantageously used also as a support of the optical compensatory sheet in an ASM (Axially Symmetric Aligned Microcell)-type liquid crystal display device having an ASM-mode liquid crystal cell. The ASM-mode liquid crystal cell is characterized in that the cell thickness is held by a position-adjustable resin spacer. The other properties of the cell are the same as those of the TN-mode liquid crystal cell. The ASM-mode liquid crystal cell and the ASM-type liquid crystal display device are described in a Kume et al's report (Kume et al., SID 98 Digest 1089 (1988)).

(Hard Coat Film, Antiglare Film, Antireflection Film)

As the case may be, the transparent polymer film of the invention may be applied to a hard coat film, an antiglare film and an antireflection film. For the purpose of improving the visibility of flat panel displays such as LCD, PDP, CRT, EL, any or all of a hard coat layer, an antiglare layer and an antireflection layer may be given to one or both surfaces of the transparent polymer film of the invention. Preferred embodiments as such antiglare film and antireflection film are described in detail in Hatsumei Kyokai Disclosure Bulletin (No. 2001-1745, issued Mar. 15, 2001, Hatsumei Kyokai), pp. 54-57, and are preferably employed also for the transparent polymer film of the invention.

EXAMPLES

Measurement Method

Firstly, methods for measuring and evaluating the characteristics as referred to in the following examples are described.

[Retardation]

Sampling was carried out at five portions in the width direction (center, edge portions (5% of the overall width from both edges), and respective two portions at the intermediate of the center and the edges) every 100 m in the longitudinal direction, and 2 cm-square samples were taken out and evaluated according to the following method. Then, the values for respective portions were averaged.

For the retardation of the film, after conditioning a film to be analyzed at 25° C. and a relative humidity of 60% for 24 hours using a prism coupler (MODEL 2010 Prism Coupler, by Metricon) and a He—Ne laser at 632.8 nm, the mean refractivity (n) of the film, which is represented by the following formula (a), is obtained at 25° C. and a relative humidity of 60%:

$$n=(n_{TE}\times 2+n_{TM})/3 \quad (a)$$

wherein $n_{TE}$ is the refractive index measured with polarizing light in the direction of film plane; and $n_{TM}$ is the refractive index measured with polarizing light in the normal direction to the surface of the film.

Next, using a birefringence meter (ABR-10A, by UNIOPT) and using a He—Ne laser at 632.8 nm, the retardation of the conditioned film are determined at 25° C. and a relative humidity of 60% both in the vertical direction relative to the film surface and in the direction inclined by ±40° from the normal line to the film face relative to the slow axis direction in the film as the inclination axis (rotation axis). Then, using the mean refractive index obtained in the above, nx, ny and nz are computed. According to the following formulae (b) and (c), the in-plane retardation (Re) and the thickness-direction retardation (Rth) of the film are computed:

$$Re=(nx-ny)\times d \quad (b)$$

$$Rth=\{(nx+ny)/2-nz\}\times d \quad (c)$$

wherein nx is the refractive index in the slow axis (x) direction of the film face; ny is the refractive index in the fast axis (y) direction of the film face; nz is the refractive index in the thickness direction of the film (in the normal direction of the film face); d is the thickness (nm) of the film; the slow axis is in the direction in which the refractive index is the largest in the film face; and the fast axis is in the direction in which the refractive index is the smallest in the film face.

$Re(\lambda)$ and $Rth(\lambda)$ are measured to be computed at the wavelength of $\lambda$ using a spectroscopic ellipsometer (M-1501, by JASCO) and a Xe light source in the vertical direction relative to the film surface and in the direction inclined by ±40° from the normal line to the film face relative to the slow axis direction in the film as the inclination axis (rotation axis) after conditioning a film at 25° C. and a relative humidity of 60% for 24 hours.

The in-plane retardation Re(H %) and the thickness-direction retardation Rth(H %) at a relative humidity of H (unit: %) are measured to be computed at 25° C. and a relative humidity of H % with a measuring wavelength of 632.8 nm in the same way as the above method after conditioning a film to be measured at 25° C. and a relative humidity of H % for 24 hours.

[Moisture Permeability]

The moisture permeability is an evaluated value from the change of masses (g/(m²·day)) before and after such humidity conditioning that respective films to be measured are used for capping and sealing cups containing calcium chloride to be left under conditions of 40° C. and a relative humidity of 90% for 24 hours.

[Polarization Degree]

Two sheets of the polarizer produced herein are stuck together with their absorption axes kept in parallel to each other and the transmittance (Tp) thereof is measured; and they are stuck together with their absorption axes kept perpendicular to each other and the transmittance (Tc) thereof is measured. The polarization degree (P) of the polarizer is computed according to the following formula:

$$\text{Polarization degree, } P=((Tp-Tc)/(Tp+Tc))^{0.5}$$

Synthesis Example 1

Synthesis of Cellulose Acetate Propionate 150 g of cellulose (hardwood pulp) and 75 g of acetic acid were put into a 5 L separable flask being a reaction vessel provided with a reflux device, which was stirred vigorously for 2 hours with heating on an oil bath that was controlled at 60° C. The cellulose that had been subjected to such pretreatment was swollen and cracked to have fluff-like appearance. The reaction vessel was placed on an ice-water bath at 2° C. for 30 minutes to be cooled.

Separately, a mixture of 1545 g of propionic anhydride as an acylating agent and 10.5 g of sulfuric acid was formed and cooled to −30° C., and then added all at once into the reaction vessel accommodating the pretreated cellulose. After the lapse of 30 minutes, the outside temperature was raised gradually and controlled so that inside temperature would reach at 25° C. after the lapse of 2 hours from the addition of the acylating agent. The reaction vessel was cooled on an ice-water bath at 5° C. and controlled so that the inside temperature would reach at 10° C. after 0.5 hour from the addition of the acylating agent, and at 23° C. after 2 hours. The reaction product was stirred for additional 3 hours while keeping the inside temperature of the vessel at 23° C. The reaction vessel was cooled on an ice-water bath at 5° C., to which 120 g of 25% by mass of water-containing acetic acid having been cooled at 5° C. was added over 1 hour. The inside temperature was increased at 40° C. to be stirred for 1.5 hours. Next, to the reaction vessel, a solution that was prepared by dissolving magnesium acetate tetrahydrate in 50% by mass of water-containing acetic acid by two times mole of sulfuric acid was added and stirred for 30 minutes. Added were 1 L of 25% by mass of water-containing acetic acid, 500 mL of 33% by mass of water-containing acetic acid, 1 L of 50% by mass of water-containing acetic acid, and 1 L of water in this order to precipitate cellulose acetate propionate. The obtained precipitate of cellulose acetate propionate was washed with warm water. By varying the washing conditions at this time, cellulose acetate propionate having varied amount of residual sulfate can be obtained. After the washing, the reaction product was stirred in a 0.005% by mass calcium hydroxide aqueous solution at 20° C. for 0.5 hour, then it was washed further with water until the pH of liquid after the washing became 7 and then vacuum-dried at 70° C.

The result of ¹H-NMR and GPC measurement showed that the obtained cellulose acetate propionate had an acetylation degree of 0.30, propionylation degree of 2.63, polymerization degree of 320. The content of sulfate was measured according to ASTM d-817-96.

Synthesis Example 2

Synthesis of Cellulose Acetate Butyrate 100 g of cellulose (hardwood pulp) and 135 g of acetic acid were put into a 5 L separable flask being a reaction vessel provided with a reflux device, which was left for 1 hour with heating on oil bath being controlled at 60° C. Then, the reaction product was stirred vigorously for 1 hour with heating on an oil bath being controlled at 60° C. The cellulose that had been subjected to such pretreatment was swollen and cracked to have fluff-like appearance. The reaction vessel was placed on an ice-water bath at 5° C. for 1 hour to cool cellulose sufficiently.

Separately, a mixture of 1080 g of butyric anhydride as an acylating agent and 10.0 g of sulfuric acid was formed and cooled to −20° C., and then added all at once into the reaction vessel accommodating the pretreated cellulose. After the lapse of 30 minutes, the outside temperature was raised up to 20° C. to react for 5 hours. The reaction vessel was cooled on an ice-water bath at 5° C., to which 2400 g of 12.5% by mass of water-containing acetic acid having been cooled at about 5° C. was added over 1 hour. The inside temperature was raised at 30° C. to be stirred for 1 hour. Next, to the reaction vessel, 100 g of a 50% by mass magnesium acetate tetrahydrate aqueous solution was added and stirred for 30 minutes. Gradually added were 1000 g of acetic acid and 2500 g of 50% by mass of water-containing acetic acid to precipitate cellulose acetate butyrate. The obtained precipitate of cellulose acetate butyrate was washed with warm water. By varying the washing conditions at this time, cellulose acetate butyrate having varied amount of residual sulfate can be obtained. After the washing, the reaction product was stirred in a 0.005% by mass calcium hydroxide aqueous solution for 0.5 hour, and then it was washed further with water until the pH of liquid after the washing became 7 and then dried at 70° C. The obtained cellulose acetate butyrate had an acetylation degree of 0.84, butylation degree of 2.12, and polymerization degree of 268.

The characteristics of the invention are described more concretely with reference to the following Examples and Comparative Examples. In the following Examples, the material used, its amount and the ratio, the details of the treatment and the treatment process may be suitably modified or changed not overstepping the sprit and the scope of the invention. Accordingly, the invention should not be limitatively interpreted by the Examples mentioned below.

Examples 101-110, Comparative Examples 101-105

Materials

Films were formed using the following materials.

1) Polymer

In respective Examples and Comparative Examples, polymers as described in Table 1 below were prepared according to the following methods respectively. The prepared polymers were heated at 120° C. to reduce the water content to at most 0.5% by mass, then respective 30 parts by mass thereof were used.

Polymer A:

As "polymer A" in Table 1, cellulose acetate butyrate (acetyl substitution degree: 1.29, butyryl substitution degree: 1.66, polymerization degree: 230) was prepared according to the following method.

A mixture of sulfuric acid (7.8 parts by mass relative to 100 parts by mass of cellulose) as a catalyst and carboxylic anhydride was cooled at −20° C. and then added to cellulose to carry out acylation at 40° C. At that time, by adjusting the type and amount of the carboxylic anhydride, the type and substitution ratio of acyl groups were adjusted. In addition, they were subjected to ripening at 40° C. after the acylation to adjust the overall substitution degree. The substitution degree and polymerization degree of the thus obtained cellulose acylate were obtained according to the following methods.

[Substitution Degree]

The substitution degree of acyl group of cellulose acylate was determined through $^{13}$C-NMR according to the method described in *Carbohydr. Res.* 273 (1995), 83-91 (by Tezuka, et al).

[Polymerization Degree]

The cellulose acylate produced herein was absolutely dried, then about 0.2 g thereof was accurately weighed, and dissolved in 100 mL of a mixed solvent of dichloromethane/ethanol=9/1 (by mass). Using an Ostwald viscometer, the time (second) taken by its dropping at 25° C. was counted, and the polymerization degree, DP of the polymer was computed according to the following formulae:

$$\eta_{rel}=T/T_0$$

$$[\eta]=\ln(\eta_{rel})/C$$

$$DP=[\eta]/Km$$

wherein T indicates the time (second) taken by the dropping sample; $T_0$ indicates the time (second) taken by the dropping solvent alone; ln indicates a natural logarithm; C indicates the concentration (g/L); Km is $6\times10^{-4}$.

Polymer B:

As "polymer B" in Table 1, cellulose acetate propionate (acetyl substitution degree: 0.32, propionyl substitution degree: 2.60, polymerization degree: 250) was prepared according to the preparation method of the polymer A.

Polymer C:

As "polymer C" in Table 1, cellulose acetate propionate (acetyl substitution degree: 0.15, propionyl substitution degree: 2.78, polymerization degree: 250) was prepared according to the preparation method of the polymer A.

Polymer D:

As "polymer D" in Table 1, cellulose acetate propionate (acetyl substitution degree: 0.12, propionyl substitution degree: 2.75, polymerization degree: 250) was prepared according to the preparation method of the polymer A.

Polymer E:

As "polymer E" in Table 1, cellulose acetate propionate (acetyl substitution degree: 2.00, propionyl substitution degree: 0.80, polymerization degree: 270) was prepared according to the preparation method of the polymer A.

Polymer F:

As "polymer F" in Table 1, "CAB381-20" (acetyl substitution degree: 1.00, butyryl substitution degree: 1.66, polymerization degree: 220) by Eastman Chemical Japan was employed.

Polymer G:

As "polymer G" in Table 1, "CAP482-20" (acetyl substitution degree: 0.18, propionyl substitution degree: 2.49, polymerization degree: 240) by Eastman Chemical Japan was employed.

2) Solvents

In respective Examples and Comparative Examples, a solvent A or a solvent B below was employed according to the following Table 1. Respective solvents had a water content of at most 0.2% by mass.

Solvent A: dichloromethane/butanol (92/8 parts by mass)

Solvent B: dichloromethane/methanol/butanol (81/15/4 parts by mass)

3) Additives

In respective Examples and Comparative Examples, any of additives A-G having the following compositions respectively was employed according to the following Table 1. The use amount of the additive in Table 1 represents addition amount of the additive relative to 100 parts by mass of polymer.

Additive A:
Triphenyl phosphate (1.2 parts by mass)
Biphenyldiphenyl phosphate (0.6 part by mass)
Sumisorb 130 (by Sumitomo Chemical) (0.6 part by mass)
Silicon dioxide fine grains (granular size: 20 nm, Mohs hardness: about 7) (0.08 part by mass)

Additive B:
Trityl alcohol (1.8 parts by mass)
Sumisorb 130 (by Sumitomo Chemical) (0.6 part by mass)
Silicon dioxide fine grains (granular size: 20 nm, Mohs hardness: about 7) (0.08 part by mass)

Additive C:
Benzenesulfonanilide (1.8 parts by mass)
Sumisorb 130 (by Sumitomo Chemical) (0.6 part by mass)
Silicon dioxide fine grains (granular size: 20 nm, Mohs hardness: about 7) (0.08 part by mass)

Additive D:
Triphenyl phosphate (0.2 part by mass)
Biphenyldiphenyl phosphate (0.1 part by mass)
Silicon dioxide fine grains (granular size: 20 nm, Mohs hardness: about 7) (0.08 part by mass)

Additive E:
Triphenyl phosphate (2.4 parts by mass)
Biphenyldiphenyl phosphate (1.2 parts by mass)
Sumisorb 130 (by Sumitomo Chemical) (0.6 part by mass)
Silicon dioxide fine grains (granular size: 20 nm, Mohs hardness: about 7) (0.08 part by mass)

Additive F:
Polyethylene glycol (molecular weight: 600) (2.4 parts by mass)
Sumisorb 130 (by Sumitomo Chemical) (0.6 part by mass)
Bis(2,6-di-t-butyl-4-methylphenyl)pentaerythritol diphosphite (0.009 part by mass)
Silicon dioxide fine grains (granular size: 20 nm, Mohs hardness: about 7) (0.08 part by mass)

Additive G:
Glycerin diacetate oleate (2.4 parts by mass)
Sumisorb 130 (by Sumitomo Chemical) (0.6 part by mass)
Bis(2,6-di-t-butyl-4-methylphenyl)pentaerythritol diphosphite (0.009 part by mass)
Silicon dioxide fine grains (granular size: 20 nm, Mohs hardness: about 7) (0.08 part by mass)

(Solution Casting Film Formation)

1) Swelling, Dissolution:

In Examples and Comparative Examples, the solvent and the additive mentioned above were put into a 400-liter stainless dissolving tank, which has stirring blades and is cooled with cooling water that runs around its periphery. With stirring and dispersing them therein, the polymer was gradually added to the tank. After the addition, this was stirred at room temperature for 2 hours. After thus swollen for 3 hours, this was again stirred to obtain a polymer solution.

For the stirring, used were a dissolver-type eccentric stirring shaft that runs at a peripheral speed of 15 m/sec (shear stress: $5\times10^4$ kgf/m/sec$^2$ [$4.9\times10^5$ N/m/sec$^2$]) and a stirring shaft that has an anchor blade at the center axis thereof and runs at a peripheral speed of 1 m/sec (shear stress, $1\times10^4$ kgf/m/sec$^2$ [$9.8\times10^4$ N/m/sec$^2$]). For the swelling, the high-speed stirring shaft was stopped and the peripheral speed of the anchor blade-having stirring shaft was reduced to 0.5 m/sec.

2) Filtration

The obtained polymer solution was filtered through a paper filter sheet (#63, by TOYO FILTER) having an absolute filtration accuracy of 0.01 mm, and then through a sintered metal filter sheet (FH025, by PAUL) having an absolute filtration accuracy of 2.5 μm to obtain a polymer solution.

3) Casting, Drying (Formation of Transparent Polymer Film)

The polymer solution was heated at 30° C., passed through a casting geeser (described in JP-A-11-314233), and cast onto a mirror-faced stainless support having a band length of 60 m and set at 15° C., at a casting speed of 15 m/min. The casting width was 200 cm. The space temperature in the entire casting zone was set at 15° C. At 50 cm before the end point of the casting zone, the polymer film thus cast and rolled was peeled off from the band, and exposed to drying air applied thereto at 45° C. Next, after drying the film at 100° C. for 5 minutes, and additionally at 110° C. for 10 minutes, it was cooled down to room temperature over 30 seconds to obtain a transparent polymer film (cellulose acylate film), a targeted product. The both edge portions of the obtained film was cut out by 3 cm, then the portions of 2-10 mm from the edges of the film were subjected to thickening processing (knurling), and the film of 1000 m was wound in a roll shape (Examples 101-105, 109, 110, Comparative Examples 101-105).

(Melt Film Formation)

1) Pelletization

In respective Examples and Comparative Examples, the polymer and the additive as listed in Table 1 were thrown into a twin screw kneading extruder provided with a evacuation means, which were extruded from a die with a screw rotation number of 300 rpm, kneading time of 40 seconds, extrusion volume of 200 kg/hr, solidified in water at 60° C., and then cut out to obtain columnar pellets having a diameter of 2 mm, length of 3 mm.

2) Filtration, Melt Extrusion

The pellet having been prepared by the above-described method was dried at 100° C. for 5 hours using a dehumidified air having a dew point of −40° C. to have a water content of at most 0.01%. The resultant was thrown into a hopper at 80° C. The melt extruder was adjusted so as to have the inlet temperature (T1) of 190° C., the outlet temperature (T2) of 210° C., the die temperature (T3) of 220° C. The screw that was used for the extruder had a diameter (outlet side) of 60 mm, L/D=50, the compression ratio of 4. On the inlet side of the screw, the oil at (Tg−5° C.) of the pellet was circulated inside the screw to cool it. The staying time of the resin in the barrel was 5 minutes. The temperature inside the barrel was set so that the barrel inlet had the lowest temperature and the barrel outlet had the highest temperature. The resin having been extruded from the extruder was discharged by a predetermined amount after having been metered with a gear pump. At this time, the rotation number of the extruder was varied so that the pressure to be applied to the resin prior to the gear pump could be controlled at a constant pressure of 10 MPa. The molten resin discharged from the gear pump was filtered with a leaf disc filter having a filtration accuracy of 5 μmm, extruded through a hanger coat die having a slit distance of 0.8 mm via a static mixer, and solidified with a casting drum at (Tg−10° C.). At this time, while using an electrostatic application method at respective levels (a wire applied with 10 kv was disposed at the position that was separated from the landing position of the melt onto the casting drum by 10 cm), electrostatic application was carried out for both side areas of the film up to 10 cm from the edge. The solidified melt was peeled off from the casting drum, whose both side areas were cut off by the width of 7.5 cm just before the winding. After subjecting the both side areas to such knurling treatment as the width of 10 mm and the height of 50 μm, the film was wound at 30 m/min in 3000 m. The width of the film was 1.5 m (Examples 106-108).

(Evaluation of Transparent Polymer Film)

Respective obtained transparent polymer films were evaluated as described below. The results are shown in Table 1 below.

[Surface Condition]

The surface condition of the film was observed visually for the obtained transparent polymer films and evaluated according to the following evaluation scale.

○: neither transverse column-like irregularity nor fisheye are recognized on the surface of the film x: remarkable undulation has occurred on the surface of the film to make the film not applicable to optical applications xx: the dope on the support can not be dried sufficiently and the significant remainder of the film has occurred on the support not to allow the film to be peeled off

[Retardation]

The retardation of the transparent polymer film was measured according to the aforementioned method.

[Moisture Permeability]

The moisture permeability of the transparent polymer film in terms of the thickness of 80 μm was measured according to the aforementioned method.

TABLE 1

|  | Polymer | Solvent type | Additive type | Addition amount (part by mass) | Thickness [μm] | Film surface condition | Re average value [nm] |
|---|---|---|---|---|---|---|---|
| Example 101 | Polymer A | Solvent A | Additive C | 8.3 | 80 | ○ | 1 |
| Example 102 | Polymer A | Solvent A | Additive B | 8.3 | 80 | ○ | 2 |
| Example 103 | Polymer B | Solvent A | Additive A | 8.3 | 80 | ○ | 1 |
| Example 104 | Polymer C | Solvent A | Additive A | 8.3 | 80 | ○ | 0 |
| Example 105 | Polymer D | Solvent B | Additive C | 8.3 | 80 | ○ | 1 |
| Example 106 | Polymer A | — | Additive F | 10.3 | 80 | ○ | 1 |
| Example 107 | Polymer A | — | Additive G | 10.3 | 80 | ○ | 2 |
| Example 108 | Polymer B | — | Additive F | 10.3 | 80 | ○ | 2 |
| Comparative Example 101 | Polymer E | Solvent B | Additive A | 8.3 | 80 | ○ | 5 |
| Comparative Example 102 | Polymer F | Solvent B | Additive A | 8.3 | 80 | ○ | 7 |
| Comparative Example 103 | Polymer G | Solvent B | Additive A | 8.3 | 80 | ○ | 6 |
| Comparative Example 104 | Polymer D | Solvent A | Additive E | 14.3 | 80 | X | Measuring failure |
| Example 109 | Polymer A | Solvent A | Additive C | 8.3 | 60 | ○ | 1 |
| Example 110 | Polymer A | Solvent A | Additive C | 8.3 | 100 | ○ | 3 |
| Comparative Example 105 | Polymer A | Solvent A | Additive C | 8.3 | (230) | XX | Measuring failure |

|  | Rth average value [nm] | |Re(700)−Re(400)| [nm] | |Rth(700)−Rth(400)| [nm] | Re(10%)−Re(80%) [nm] | Rth(10%)−Rth(80%) [nm] | Moisture permeability in terms of 80 μm [g/m² · day] |
|---|---|---|---|---|---|---|
| Example 101 | 6 | 1 | 12 | 0 | 1 | 750 |
| Example 102 | 15 | 1 | 15 | 0 | 2 | 830 |
| Example 103 | 1 | 2 | 14 | 1 | 8 | 840 |
| Example 104 | 0 | 2 | 15 | 0 | 9 | 840 |
| Example 105 | −2 | 1 | 13 | 1 | 14 | 830 |
| Example 106 | 5 | 2 | 15 | 1 | 6 | 840 |
| Example 107 | 10 | 2 | 16 | 1 | 7 | 860 |
| Example 108 | 2 | 3 | 14 | 1 | 5 | 890 |
| Comparative Example 101 | 34 | 2 | 14 | 2 | 19 | 810 |
| Comparative Example 102 | 24 | 1 | 14 | 1 | 11 | 730 |
| Comparative Example 103 | 33 | 1 | 14 | 2 | 21 | 810 |
| Comparative Example 104 | Measuring failure | Measuring failure | Measuring failure | Measuring failure | Measuring failure | Measuring failure |
| Example 109 | 5 | 1 | 9 | 0 | 1 | 740 |
| Example 110 | 8 | 2 | 14 | 1 | 2 | 750 |
| Comparative Example 105 | Measuring failure | Measuring failure | Measuring failure | Measuring failure | Measuring failure | Measuring failure |

Example 201

Formation of Optical Compensatory Film

The transparent polymer film obtained in Example 101 was used for forming an optical compensatory film sample according to the method as described in JP-A-2003-315541, Example 1.

Concretely, a solution prepared by dissolving polyimide (mass average molecular weight (mw): 70000, Δn: about 0.04) that had been synthesized from 2,2'-bis(3,4-dicarboxyphenyl)hexafluoropropane dehydrate (6FDA) and 2,2'-bis(trifluoromethyl)-4,4'-diaminobiphenyl (TFMB) in cyclohexanone (solvent) to give 25% by mass was coated on the transparent polymer film obtained in Example 101, which was then heat-treated at 100° C. for 10 minutes. After the heat treatment, the laminate was subjected to longitudinal monoaxial stretching of 15% at 130° C. to obtain an optical compensatory film in which a polyimide layer having a thickness of 5.7 μm was formed on the transparent polymer film obtained in Example 1. The optical compensatory film had such optical properties as Re=70 nm, Rth=220 nm, a misalignment angle of the alignment axis of at most ±0.3°, and a birefringent layer satisfying nx>ny>nz.

Example 202

An optical compensatory film was obtained in the same way as in Example 201, except that the transparent film obtained in Example 106 was used in place of the transparent film obtained in Example 101. The optical compensatory film had such optical properties as Re=75 nm, Rth=260 nm.

Comparative Example 201

An optical compensatory film was obtained in the same way as in Example 201, except that the transparent film obtained in Comparative Example 101 was used in place of the transparent film obtained in Example 101. The optical compensatory film had such optical properties as Re=75 nm, Rth=260 nm.

Examples 301-310, Comparative Examples 301-307

Formation of Polarizer

The obtained film was subjected to saponification treatment, which was used for forming a polarizer.

1) Saponification of Film 360 parts by mass of sodium hydroxide was dissolved in 3000 parts by mass of water to prepare an alkali aqueous solution, which was moved to an alkali solution tank and the liquid temperature thereof was adjusted at 55° C. In the saponification liquid, each of film described in columns of film A and film B of Table 2 was dipped for 2 minutes, which was water-washed, dipped in a 0.05 mol/L sulfuric acid aqueous solution for 30 seconds, and then passed through a water-washing bath. Then, the film was subjected to air knife treatment three times to remove water and retained in a drying zone at 70° C. for 15 seconds to be dried, to form a saponified film.

2) Formation of Polarizing Layer

According to JP-A-2001-141926, Example 1, the film was stretched in a longitudinal direction by giving difference in circumferential velocities to two pairs of nip rolls, to prepare a polarizing layer having a thickness of 20 μm.

3) Sticking

The polarizing layer thus obtained and two films (film A and film B respectively, whose combination in respective Examples and Comparative Examples is listed in Table 2 below) selected from the saponified films were so arranged that the saponified surfaces faced to the polarizing film and sandwiched the polarizing layer, which were then stuck to each other using a 3% PVA (PVA-117H, by KURARAY) aqueous solution as an adhesive in such a manner that the polarizing axis crossed perpendicularly to the longer direction of the film.

In Table 2 below, "TD80UF" is FIJITAC TD80UF (by FUJIFILM; moisture permeability=430 g/(m²·day) at 40° C. and a relative humidity of 90% (in terms of the thickness of 80 μm)); "TF80UL" is FIJITAC TF80UL (by FUJIFILM; moisture permeability=430 g/(m²·day) at 40° C. and a relative humidity of 90% (in terms of the thickness of 80 μm), |Re|=7 nm, |Rth|=52 nm, Re(700)−Re(400)=11 nm, Rth(700)−Rth(400)=23 nm, Re(10%)−Re(80%)=12 nm, Rth(10%)−Rth(80%)=35 nm); "polycarbonate" is PANLITE C1400 (by Teijin Chemicals; moisture permeability=25 g/(m²·day) at 40° C. and a relative humidity of 90% (in terms of the thickness of 80 μm)); "COC1" is ARTON film (thickness: 80 μm, by JSR; moisture permeability=30 g/(m²·day) at 40° C. and a relative humidity of 90% (in terms of the thickness of 80 μm)); "COC2" is ZEONOR film (thickness: 100 μm, by ZEON; moisture permeability=0 g/(m²·day) at 40° C. and a relative humidity of 90% (in terms of the thickness of 80 μm), Re=5 nm, Rth=6 nm, Re(700)−Re(400)=1 nm, Rth(700)−Rth(400)=1 nm, Re(10%)−Re(80%)=0 nm, Rth(10%)−Rth(80%)=1 nm).

(Evaluation of Polarizer)

[Initial Polarization Degree]

The polarization degree of the polarizer was calculated according to the method described above. The results are listed in Table 2.

[After Storage Polarization Degree]

The polarizer was stuck to a glass plate on the A side thereof with an adhesive, which was left under conditions of 60° C. and a relative humidity of 95% for 500 hours and the polarization degree after the lapse of time (after storage polarization degree) was calculated according to the aforementioned method. The results are listed in Table 2 below. The transparent polymer film of the invention has a higher moisture permeability compared with those of commercially available cellulose acetate films such as "TD80UF", therefore the lowering of the polarization degree of a polarizer may be apprehended. However, it is known that the lowering of the polarization degree can be avoided by sticking the film of the invention to a glass plate in such an arrangement.

TABLE 2

|  | Film A | Film B | Initial polarizing degree [%] | After storage polarizing degree [%] |
|---|---|---|---|---|
| Example 301 | Example 101 | TD80UF | 99.9 | 99.9 |
| Example 302 | Example 102 | TD80UF | 99.9 | 99.9 |
| Example 303 | Example 103 | TD80UF | 99.9 | 99.9 |
| Example 304 | Example 104 | TD80UF | 99.9 | 99.9 |

TABLE 2-continued

|  | Film A | Film B | Initial polarizing degree [%] | After storage polarizing degree [%] |
|---|---|---|---|---|
| Example 305 | Example 105 | TD80UF | 99.9 | 99.9 |
| Example 306 | Example 106 | TD80UF | 99.9 | 99.9 |
| Example 307 | Example 107 | TD80UF | 99.9 | 99.9 |
| Example 308 | Example 108 | TD80UF | 99.9 | 99.9 |
| Example 309 | Example 109 | TD80UF | 99.9 | 99.9 |
| Example 310 | Example 110 | TD80UF | 99.9 | 99.9 |
| Comparative Example 301 | Polycarbonate | Polycarbonate | (Insufficient sticking property; measuring failure) | |
| Comparative Example 302 | COC1 | COC1 | (Insufficient sticking property; measuring failure) | |
| Comparative Example 303 | COC2 | COC2 | (Insufficient sticking property; measuring failure) | |
| Comparative Example 304 | Comparative Example 101 | TD80UF | 99.9 | 99.9 |
| Comparative Example 305 | Comparative Example 102 | TD80UF | 99.9 | 99.9 |
| Comparative Example 306 | Comparative Example 103 | TD80UF | 99.9 | 99.9 |
| Comparative Example 307 | TF80UL | TF80UL | 99.9 | 99.9 |

Examples 311-312, Comparative Example 308

Polarizers were formed and evaluated in the same way as in Example 301, except that films described in Table 3 were used, that the saponified surface in the above "1) Saponification of Film" was changed to the side having no coated polyimide, and that the lamination was carried out in the above "3) Sticking" so that the slow axis direction of the optical compensatory film crossed perpendicularly to the absorption axis of the polarizer. The results are listed in Table 3 below.

TABLE 3

| Polarizer | Film A | Film B | Initial polarizing degree [%] | After storage polarizing degree [%] |
|---|---|---|---|---|
| Example 311 | Example 201 | TD80UF | 99.9 | 99.9 |
| Example 312 | Example 202 | TD80UF | 99.9 | 99.9 |
| Comparative Example 308 | Comparative Example 201 | TD80UF | 99.9 | 99.9 |

The polarizers in Comparative Examples 304-308 had the same performance as the polarizers in Examples 301-312 for the initial polarizing degree and the after storage polarizing degree, but, as described later, when they were disposed in a liquid crystal display device, it had poor quality in the viewing angle property and hue change.

Examples 401-410

Mounting evaluation for Liquid Crystal Display Device

Mounting evaluation for liquid crystal display device was carried out by using transparent polymer films, optical compensatory films and polarizers in respective Examples in order to check whether or not these had sufficient optical performance. Incidentally, a liquid crystal cell of an IPS type, a VA type or an OCB type was used here, however, the application of the transparent plastic film, the optical compensatory film and the polarizer of the invention is not limited by the operation mode of a liquid crystal display device.

(Mounting Evaluation for IPS Type Liquid Crystal Display Device 1)

An ARTON film (by JSR) was stretched uniaxially to form an optical compensatory film having Re of 270 nm, Rth of 0 nm. To this, each of the polarizers in Examples 301-310 were stuck so that the slow axis direction in the plane of the optical compensatory film crossed perpendicularly to the transmission axis of the polarizer to form laminates having an optical compensatory function. Respective processes were referred to as Examples 401-410.

In Examples 401-410, two pairs of the laminates were formed respectively, which were used to form liquid crystal display devices in which "the laminate in Examples 401-410/ an IPS type liquid crystal cell/the laminate in Examples 401-410" were superimposed and built in this order in such a manner that the respective optical compensatory films lied on the liquid crystal cell side. In this case, transmission axes of the upside and downside polarizers were crossed perpendicularly to each other, and the transmission axis of the upside polarizer was set parallel to the molecular long axis direction of the liquid crystal cell (that is, the slow axis of the optical compensatory layer and the direction of the longitudinal axis of the molecule in the liquid crystal cell were crossed perpendicularly to each other). For the liquid crystal cell, electrode and substrate, those that had been conventionally used for IPS type were employed directly. The liquid crystal cell used was aligned horizontally, the liquid crystal used had a positive permittivity anisotropy, both of which are developed and commercially available for an IPS type liquid crystal cell. The liquid crystal cell had such physical properties as An of the liquid crystal: 0.099, cell gap of the liquid crystal layer: 3.0 μm, pretilt angle: 5°, rubbing direction: 75° for the upside and downside of the substrate.

For all the liquid crystal display devices having been formed as above, the light leakage percentage at the time of black level was measured in the azimuthal angle direction of 45° and the polar direction of 70° from the front side of the apparatus. The result showed such good viewing angle property as at most 0.10%. It was also known that the apparatus had an excellent display hue because the wavelength dispersiveness of retardation was small.

On the contrary, when the same evaluation was carried out using the polarizers in Comparative Examples 304-307, it was known that all the liquid crystal display devices had the light leakage percentage of around 0.5% and a poor viewing angle property.

In addition, the liquid crystal display devices for which the transparent polymer films in Examples 101-110 were employed had a small humidity dependency of retardation. Consequently, it was known that, compared with liquid crystal display devices using the transparent polymer films in Comparative Examples 101-103 for which the variation of the light leakage percentage caused by the variation of external humidity change was observed, no such problem occurred for the liquid crystal display devices using the transparent polymer films in Examples 101-110.

(Mounting Evaluation for IPS Type Liquid Crystal Display Device 2)

On a glass substrate, electrodes were so arranged that the distance between the adjacent electrodes was 20 μm, on which a polyimide film was provided as an alignment film and subjected to rubbing treatment. On one surface of a glass substrate that was prepared separately, a polyimide film was provided and subjected to rubbing treatment to form an alignment film. The two glass substrates were superimposed and stuck in such a manner that the alignment films faced to each other, that the distance (gap: d) between the substrates was 3.9 μm, and that the rubbing directions of the two glass substrates were parallel to each other. Then, a nematic liquid crystal composition having a refraction factor anisotropy (Δn) of 0.0769 and a permittivity anisotropy (Δε) of positive 4.5 was sealed. The liquid crystal layer had a d·Δn value of 300 nm.

The polarizer in Example 302 was stuck on one side of the IPS mode liquid crystal cell in such a manner that the absorption axis thereof was parallel to the rubbing direction of the liquid crystal cell, and that the film A side lied on the liquid crystal cell side; and then, on the other side of the liquid crystal cell, the polarizer in the Comparative Example 306 was stuck in the crossed nicols arrangement. Next, a liquid crystal display device was formed so that a backlight was to be arranged on the side of the polarizer in Example 302.

In the same way as described above, the mounting evaluation was carried out using the polarizer in Comparative Example 306 in place of the polarizer in Example 302. The hue of black of the liquid crystal display device was evaluated by the variation (Δuv) in the entire azimuthal angle direction at a polar angle of 60° to obtain such results that the Δuv was at most 0.05 when the polarizer in Example 302 was used not to lead to recognition of substantial hue change, but that the Δuv exceeded 0.05 when two polarizers in Comparative Example 306 were used to lead to clear recognition of hue change. Additionally, it was also known that the hue change is improved by employing the transparent film and the polarizer of the invention having small Re and Rth, and small wavelength dependency.

(Mounting Evaluation for VA Type, OCB Type Liquid Crystal Display Device)

The films in Examples 101-107 were used for the evaluation in the liquid crystal display device as described in JP-A-10-48420, Example 1; the optically anisotropic layer including discotic liquid crystal molecules as described in JP-A-9-26572, Example 1; an alignment film having been coated with polyvinyl alcohol; the VA type liquid crystal display device as described in JP-A-2000-154261, FIGS. 2-9; and the OCB type liquid crystal display device as described in JP-A-2000-154261, FIGS. 10-15. The results showed that every case gave the performance of good contrast viewing angle.

(Mounting Evaluation for VA Type Liquid Crystal Display Device)

The polarizer in Example 311 was stuck to a VA type liquid crystal display device with an adhesive in such a manner that the optical compensatory film side lied on the liquid crystal cell side. On the opposite side of the liquid crystal cell, the polarizer in Comparative Example 311 was stuck to the VA type liquid crystal panel via an adhesive in such a manner that the absorption axes of the polarizers crossed perpendicularly to each other. From the result of the measurement of the viewing angle property of the liquid crystal display device thus obtained, it was known that the device shows good properties.

The same mounting evaluation was carried out while using the polarizer in Example 312 in place of that in Example 311, it was known that the device shows good properties as is the case where the polarizer in Example 311 is used.

On the contrary, when the polarizer in Comparative Example 308 was used in place of that in Example 311 in the mounting evaluation, it was known that the device showed degraded viewing angle properties in the left, right, top and bottom directions. Thus, it was known that the transparent polymer film, the optical compensatory film and the polarizer of the invention are excellent as the retardation film for the VA type application.

INDUSTRIAL APPLICABILITY

According to the present invention, a transparent polymer film having a reasonable moisture permeability, and a small Re and Rth independently of wavelengths and measurement environments can be provided, and additionally, an excellent optical compensatory film can be provided. Since the transparent polymer film of the invention has a reasonable moisture permeability, it can be stuck to a polarizing film in on-line operation, thereby making it possible to provide polarizers being excellent in visibility and liquid crystal display devices having a high reliability in a high productivity. Consequently, the invention has a high industrial applicability.

What is claimed is:

1. A transparent polymer film satisfying all the following formulae (I)-(III), and having a moisture permeability of at least 500 g/(m²·day) in terms of the thickness of 80 μm at 40° C. and a relative humidity of 90%:

$$Re<5, \text{ and } |Rth|<20 \quad (I)$$

$$|Re(700)-Re(400)|<5, \text{ and} \quad (II)$$

$$|Rth(700)-Rth(400)|<20$$

$$|Re(10\%)-Re(80\%)|<5, \text{ and} \quad (III)$$

$$|Rth(10\%)-Rth(80\%)|<15$$

wherein Re and Rth represent in-plane retardation and thickness-direction retardation (unit: nm) respectively at a measuring wavelength of 632.8 nm, Re(λ) and Rth(λ) represent in-plane retardation and thickness-direction retardation (unit: nm) respectively at a wavelength of λ (unit: nm), Re(H %) and Rth(H %) represent in-plane retardation and thickness-direction retardation respectively at a relative humidity H (unit: %) and a measuring wavelength of 632.8 nm.

2. The transparent polymer film according to claim 1, wherein the thickness of the film is 50-180 μm.

3. The transparent polymer film according to claim 1, wherein the main component polymer of the polymer film is cellulose acylate.

4. The transparent polymer film according to claim 3, wherein the cellulose acylate satisfies both the following formulae (IV) and (V):

$$2.70 \leq SA+SP \leq 3.00 \quad (IV)$$

$$2.00 \leq SP \leq 2.95 \quad (V)$$

wherein SA and SP represent the substitution degree of an acetyl group and the substitution degree of a propionyl group respectively substituted to the hydroxyl group of the cellulose.

5. The transparent polymer film according to claim 3, wherein cellulose acylate satisfies both the following formulae (VI) and (VII):

$$2.80 \leq SA+SB \leq 3.00 \quad (VI)$$

$$1.50 \leq SB \leq 2.50 \quad (VII)$$

wherein SA and SB represent the substitution degree of an acetyl group and the substitution degree of a butyryl group respectively substituted to the hydroxyl group of the cellulose.

6. The transparent polymer film according to claim 3 comprising an additive having a molecular weight of at most 3000 in an amount of 2-10% by mass relative to the cellulose acylate.

7. The transparent polymer film according to claim 3 comprising an additive having a molecular weight of at most 3000 in an amount of at most 8% by mass relative to the cellulose acylate.

8. An optical compensatory film comprising an optically anisotropic layer satisfying $0 \leq Re \leq 200$ nm and $|Rth| \leq 400$ nm on the transparent polymer film as described in claim 1.

9. The optical compensatory film according to claim 8, wherein the optically anisotropic layer comprises a discotic liquid crystal layer.

10. The optical compensatory film according to claim 8, wherein the optically anisotropic layer comprises a rod-shaped liquid crystal layer.

11. The optical compensatory film according to claim 8, wherein the optically anisotropic layer is formed of a polymer film.

12. The optical compensatory film according to claim 11, wherein the polymer film comprises at least one type of polymer material selected from the group consisting of polyamide, polyimide, polyester, polyether ketone, polyamideimide, polyesterimide and polyaryl ether ketone.

13. A polarizer comprising a first protective film, a second protective film, and a polarizing film that is sandwiched between the first protective film and the second protective film, wherein the first protective film is formed of at least one sheet of transparent polymer film described in claim 1.

14. A polarizer comprising a first protective film, a second protective film, and a polarizing film sandwiched between the first protective film and the second protective film, wherein the first protective film is formed of at least one sheet of optical compensatory film described in claim 8.

15. The polarizer according to claim 13, wherein the second protective film is formed of a transparent polymer film having a moisture permeability of less than 500 $g/(m^2 \cdot day)$ in terms of the thickness of 80 μm at 40° C. and a relative humidity of 90%.

16. The polarizer according to claim 13 comprising at least one layer of a hard-coat layer, an antiglare layer and an antireflection layer on the surface thereof.

17. A liquid crystal display device comprising the transparent polymer film as described in claim 1.

18. A liquid crystal display device, wherein the polarizer as described in claim 13 is so arranged that the first protective film thereof lies on the liquid crystal cell side.

19. The liquid crystal display device according to claim 17, wherein the liquid crystal display device is of a VA type.

20. The liquid crystal display device according to claim 17, wherein the liquid crystal display device is of an IPS type.

* * * * *